United States Patent
Arimatsu et al.

(10) Patent No.: US 12,526,391 B2
(45) Date of Patent: Jan. 13, 2026

(54) IMAGE DATA GENERATION DEVICE, DISPLAY DEVICE, IMAGE DISPLAY SYSTEM, IMAGE DATA GENERATION METHOD, IMAGE DISPLAY METHOD, AND DATA STRUCTURE OF IMAGE DATA

(71) Applicant: Sony Interactive Entertainment Inc., Tokyo (JP)

(72) Inventors: Kazuyuki Arimatsu, Tokyo (JP); Masaaki Hamada, Tokyo (JP); Hiroyuki Kawahara, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 243 days.

(21) Appl. No.: 18/561,729

(22) PCT Filed: May 19, 2021

(86) PCT No.: PCT/JP2021/018931
§ 371 (c)(1),
(2) Date: Nov. 17, 2023

(87) PCT Pub. No.: WO2022/244131
PCT Pub. Date: Nov. 24, 2022

(65) Prior Publication Data
US 2024/0223738 A1 Jul. 4, 2024

(51) Int. Cl.
*H04N 13/117* (2018.01)
*G06T 7/50* (2017.01)
(Continued)

(52) U.S. Cl.
CPC .............. *H04N 13/117* (2018.05); *G06T 7/50* (2017.01); *G06T 7/90* (2017.01); *G06T 15/06* (2013.01);
(Continued)

(58) Field of Classification Search
CPC ...... H04N 13/117; H04N 13/194; G06T 7/50; G06T 7/90; G06T 15/06; G06T 2207/10024
See application file for complete search history.

(56) References Cited

U.S. PATENT DOCUMENTS 10,119,808 B2 * 11/2018 Venkataraman ........ G06T 7/557
2015/0042767 A1 * 2/2015 Ciurea ................. H04N 13/232
348/48
(Continued)

FOREIGN PATENT DOCUMENTS

JP     2015-019326 A    1/2015
JP     2021-015156 A    2/2021
(Continued)

OTHER PUBLICATIONS

International Search Report and Written Opinion mailed on Aug. 10, 2021, received for PCT Application PCT/JP2021/018931, filed on May 19, 2021, 9 pages including English Translation.
(Continued)

*Primary Examiner* — Xin Sheng
(74) *Attorney, Agent, or Firm* — Fish & Richardson P.C.

(57) ABSTRACT

A viewpoint setting unit of an image data generation device sets a reference viewpoint on a basis of position and orientation information regarding a head-mounted display, and a reference image drawing unit generates a reference image in a field of view corresponding to the reference viewpoint. An additional data generation unit acquires color information regarding an occluded part not represented in the reference image from a different viewpoint as additional sampling data. A reprojection unit of the head-mounted display transforms the reference image into an image from a latest viewpoint and determines a pixel value of the hidden part using the additional sampling data.

12 Claims, 15 Drawing Sheets

(51) Int. Cl.
  *G06T 7/90* (2017.01)
  *G06T 15/06* (2011.01)
  *H04N 13/194* (2018.01)

(52) U.S. Cl.
  CPC . *H04N 13/194* (2018.05); *G06T 2207/10024* (2013.01)

(56) References Cited

U.S. PATENT DOCUMENTS

| | | | |
|---|---|---|---|
| 2016/0309084 A1* | 10/2016 | Venkataraman | H04N 25/531 |
| 2020/0228774 A1* | 7/2020 | Kar | G06T 15/08 |
| 2021/0065432 A1 | 3/2021 | Bickerstaff et al. | |

FOREIGN PATENT DOCUMENTS

| | | |
|---|---|---|
| KR | 10-2020-0143276 A | 12/2020 |
| WO | 2017/183346 A1 | 10/2017 |
| WO | 2018/221211 A1 | 12/2018 |
| WO | 2020/090316 A1 | 5/2020 |
| WO | 2021049281 A1 | 3/2021 |

OTHER PUBLICATIONS

International Preliminary Report on Patentability in International Appln. No. PCT/JP2021/018931, mailed on Nov. 30, 2023, 14 pages (with Machine Translation).

Schollmeyer, et al., "Efficient Hybrid Image Warping for High Frame-Rate Stereoscopic Rendering," IEEE Transactions on Visualization and Computer Graphics, Jan. 25, 2017, 23(4):1332-1341.

Translation of Written Opinion in International Appln. No. PCT/JP2021/018931, mailed on Aug. 10, 2021, 3 pages.

Wißmann et al. "Accelerated Stereo Rendering with Hybrid Reprojection-Based Rasterization and Adaptive RayTracing," Paper, 2020 IEEE Conference on Virtual Reality and 3D User Interfaces (VR), Atlanta, GA, Mar. 22-26, 2020; IEEE Virtual Reality and 3D User Interfaces (VR), Mar. 22, 2020, pp. 828-835.

\* cited by examiner

F I G . 1
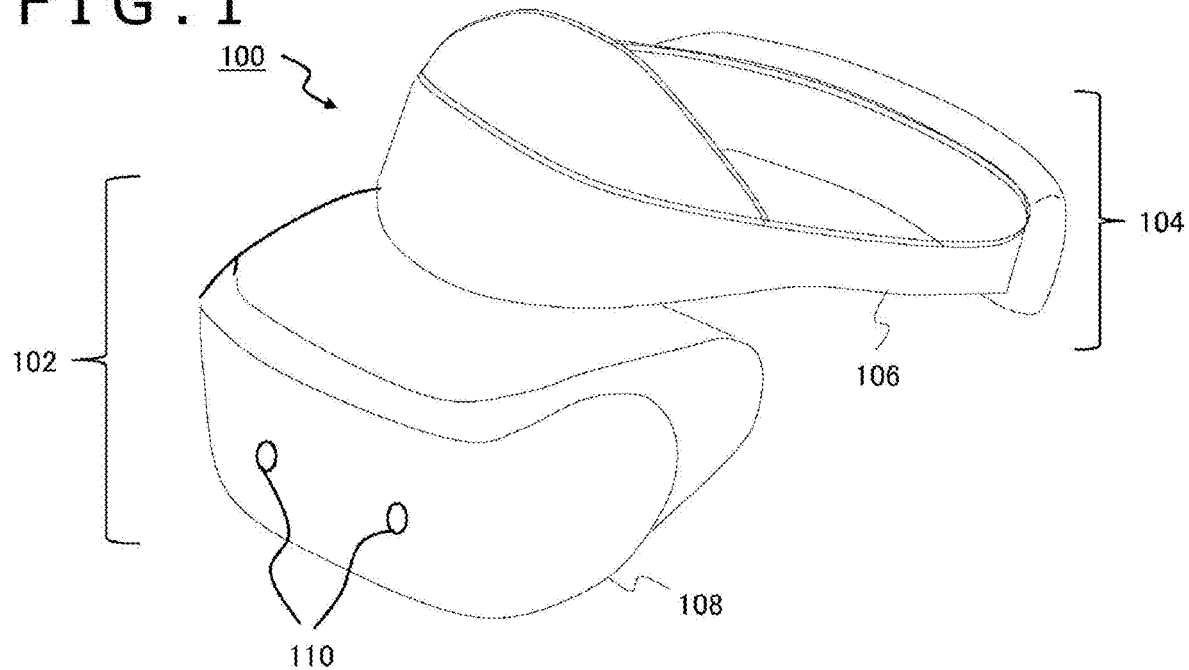
F I G . 2
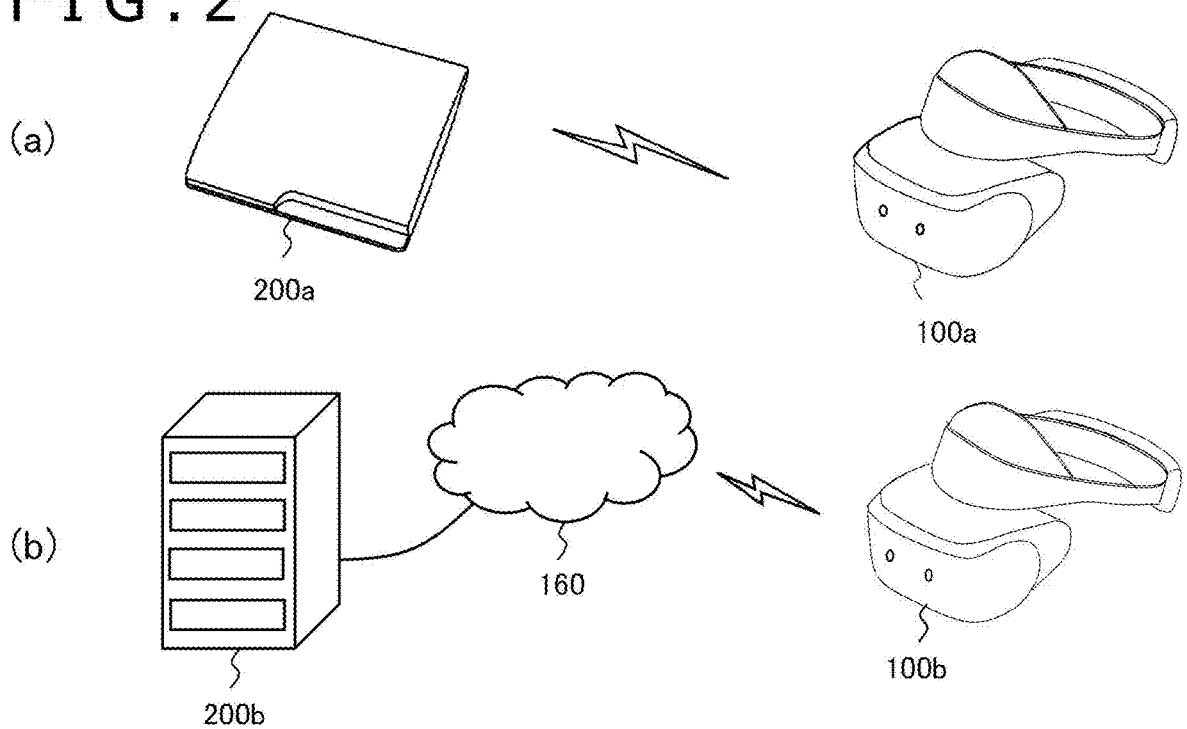

(a)

(b)

(a)

(b)

IMAGE DATA GENERATION DEVICE, DISPLAY DEVICE, IMAGE DISPLAY SYSTEM, IMAGE DATA GENERATION METHOD, IMAGE DISPLAY METHOD, AND DATA STRUCTURE OF IMAGE DATA

CROSS-REFERENCE TO RELATED APPLICATION

The present application is based on PCT filing PCT/JP2021/018931, filed May 19, 2021, the entire contents of which is incorporated herein by reference.

TECHNICAL FIELD

The present invention relates to an image data generation device configured to generate an image with a change in field of view, a display device configured to display the image in question, an image display system, an image data generation method, an image display method, and a data structure of image data.

BACKGROUND ART

An image display system configured to allow watching a target space from a free viewpoint has been widespread. For example, electronic content for displaying a virtual three-dimensional space has been known, which displays an image corresponding to the line of sight of a user wearing a head-mounted display, thereby implementing VR (virtual reality). By utilizing a head-mounted display, it is possible to enhance immersion into a video world and improve operability of applications such as games. Further, a walk-through system has also been developed, in which a user wearing a head-mounted display can virtually walk around inside a space displayed as video by physically moving.

SUMMARY

Technical Problem

Regardless of a type of display device, in a case where user operations using their viewpoints or lines of sight are allowed, high responsiveness is required for image display. On the other hand, to achieve more realistic image representation, a higher resolution and complex calculations are required, leading to an increase in image processing load. In a case where image data is transferred from a device separate from the display device, the transfer time is also required. As a result, a noticeable delay occurs until an image in a field of view corresponding to an operation is displayed, thereby tending to impair a sense of presence or provide a feeling of discomfort to arise. In the case of a head-mounted display, in particular, a delay in video relative to head movement causes motion sickness.

The present invention has been made in view of these problems, and an object thereof is to provide a technology capable of achieving both responsiveness and quality of image display.

Solution to Problem

A certain aspect of the present invention relates to an image data generation device. This image data generation device includes a viewpoint setting unit configured to set a reference viewpoint at a predetermined time step, on the basis of information associated with a viewpoint change with respect to a space that is a display target, a reference image drawing unit configured to draw a reference image representing the space in a field of view corresponding to the reference viewpoint, an additional data generation unit configured to acquire, as additional sampling data, color information regarding an occluded part in the space not represented in the reference image, after setting a different viewpoint from the reference viewpoint, and a transmission unit configured to transmit the reference image and the additional sampling data to a display device in association with each other.

Another aspect of the present invention relates to a display device. This display device is a display device configured to represent a space that is a display target by changing a field of view, on the basis of information associated with a viewpoint change, the display device including an image data acquisition unit configured to acquire data on a reference image representing the space in a field of view corresponding to a reference viewpoint and additional sampling data including color information regarding an occluded part in the space not represented in the reference image, a reprojection unit configured to transform the reference image into an image in a field of view corresponding to a latest viewpoint and add the color information with use of the additional sampling data, thereby generating a display image, and a display unit configured to output the display image.

Still another aspect of the present invention relates to an image display system. This image display system is an image display system configured to represent a space that is a display target by changing a field of view, on the basis of information associated with a viewpoint change, the image display system including an image data generation device, and a display device, in which the image data generation device includes a viewpoint setting unit configured to set a reference viewpoint at a predetermined time step, a reference image drawing unit configured to draw a reference image representing the space in a field of view corresponding to the reference viewpoint, an additional data generation unit configured to acquire, as additional sampling data, color information regarding an occluded part in the space not represented in the reference image, after setting a different viewpoint from the reference viewpoint, and a transmission unit configured to transmit the reference image and the additional sampling data in association with each other, and the display device includes an image data acquisition unit configured to acquire the reference image and the additional sampling data, a reprojection unit configured to transform the reference image into an image in a field of view corresponding to a latest viewpoint and add the color information with use of the additional sampling data, thereby generating a display image, and a display unit configured to output the display image.

Yet another aspect of the present invention relates to an image data generation method. This image data generation method includes a step of setting a reference viewpoint at a predetermined time step on the basis of information associated with a viewpoint change with respect to a space that is a display target, a step of drawing a reference image representing the space in a field of view corresponding to the reference viewpoint, a step of acquiring, as additional sampling data, color information regarding an occluded part in the space not represented in the reference image, after setting a different viewpoint from the reference viewpoint, and a step of transmitting the reference image and the additional sampling data to a display device in association with each other.

A further aspect of the present invention relates to an image display method. This image display method is for causing a display device configured to represent a space that is a display target by changing a field of view on the basis of information associated with a viewpoint change to perform a step of acquiring data on a reference image representing the space in a field of view corresponding to a reference viewpoint and additional sampling data including color information regarding an occluded part not represented in the reference image, a step of transforming the reference image into an image in a field of view corresponding to a latest viewpoint and adding the color information with use of the additional sampling data, thereby generating a display image, and a step of outputting the display image.

A still further aspect of the present invention relates to a data structure of image data. This data structure is a data structure of image data for representing a space that is a display target by changing a field of view on the basis of information associated with a viewpoint change, in which data on a reference image representing the space in a field of view corresponding to a reference viewpoint, position information regarding the reference viewpoint, color information regarding an occluded part in the space not represented in the reference image, and information associated with a position of the occluded part for which the color information has been acquired are associated with each other, an image data acquisition unit of a display device acquires the image data, and a reprojection unit transforms the reference image into an image in a field of view corresponding to a latest viewpoint and adds the color information as a silhouette image of the occluded part, thereby generating a display image.

Note that any combination of the components described above, as well as modes obtained by transforming the expressions of the present invention between methods, devices, systems, computer programs, data structures, recording media, and the like are also effective as aspects of the present invention.

Advantageous Effects of Invention

According to the present invention, it is possible to achieve both responsiveness and quality of image display.

BRIEF DESCRIPTION OF DRAWINGS

FIG. 1 is a view illustrating an appearance example of a head-mounted display in the present embodiment.

FIG. 2 depicts diagrams each illustrating a configuration example of an image display system in the present embodiment.

DESCRIPTION OF EMBODIMENT

Figure 3:
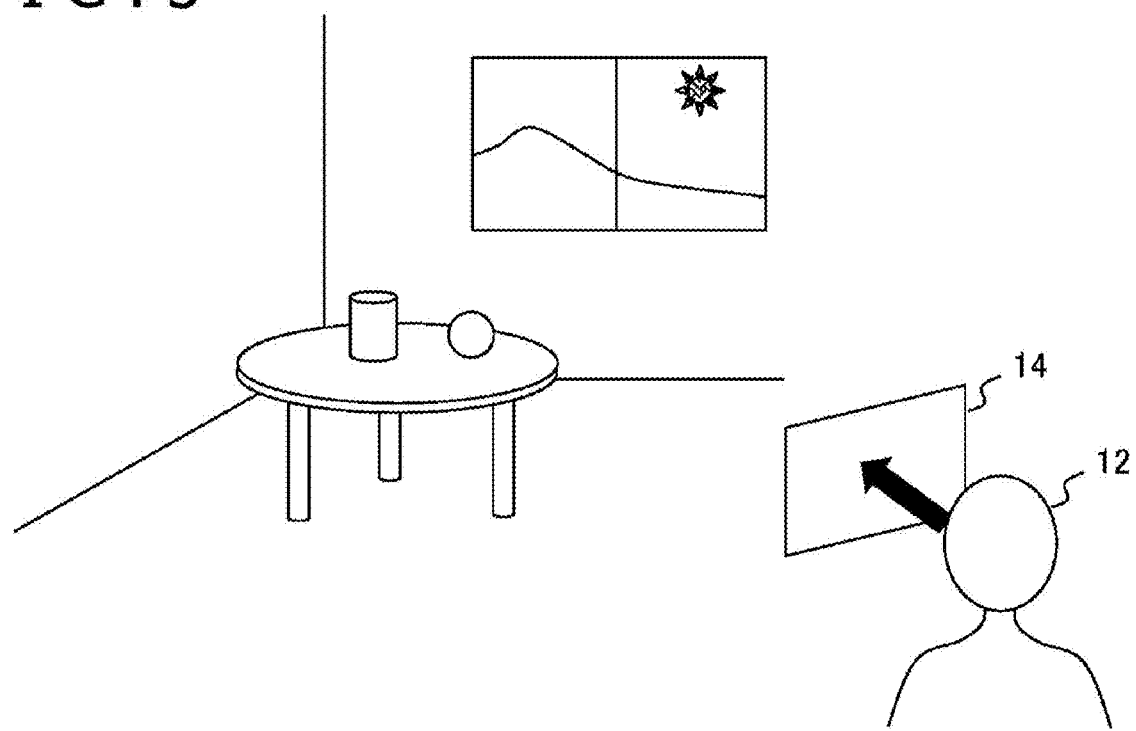
FIG. 3 is a diagram illustrating an exemplary image world displayed by the head-mounted display under control of an image data generation device in the present embodiment.

The present embodiment relates to a system configured to display an image with a change in a field of view with respect to a three-dimensional space that is a display target in response to a user's position and posture, user operations, and the like. In this regard, a device configured to display an image is not particularly limited to a head-mounted display, a wearable terminal, a mobile terminal, a flat panel display, a television receiver, or the like. In the following, however, a head-mounted display will be described as an example. FIG. 1 illustrates an appearance example of a head-mounted display 100. In this example, the head-mounted display 100 includes an output mechanism 102 and a mounting mechanism 104. The mounting mechanism 104 includes a wearing band 106 configured to encircle, when worn by the user, the head to fix the device.

The output mechanism 102 includes a casing 108 shaped to cover left and right eyes of the user wearing the head-mounted display 100. The output mechanism 102 includes, inside the casing 108, a display panel so as to face the eyes of the user when he/she wears the head-mounted display 100. The output mechanism 102 may also include, inside the casing 108, eyepiece lenses configured to enlarge the user's viewing angle. The eyepiece lenses are positioned between the display panel and the eyes of the user when he/she wears the head-mounted display 100. Further, the head-mounted display 100 may also include speakers or earphones at positions that are to be aligned with the user's ears when he/she wears the head-mounted display 100. Further, the head-mounted display 100 includes a built-in motion sensor and detects the translational motion and rotational motion of the head of the user wearing the head-mounted display 100, and further, the position and the orientation of the user's head at each time.

In this example, the head-mounted display 100 includes a stereo camera 110 on the front surface of the casing 108 and captures a moving image of a surrounding real space in a field of view corresponding to the user's line of sight. The head-mounted display 100 displays a captured image instantly, thereby being capable of implementing what is generally called video see-through that allows the user to directly see what an actual space is like in the direction that he/she is facing. Moreover, the head-mounted display 100 draws a virtual object on a silhouette image of a real object appearing in a captured image, thereby being capable of implementing AR (augmented reality). Further, the head-mounted display 100 analyzes a captured image using technologies such as VSLAM (Visual Simultaneous Localization and Mapping), thereby being capable of identifying the position and the orientation of the head-mounted display 100.

FIG. 2 illustrates configuration examples of an image display system in the present embodiment. In the configuration illustrated in (a), a head-mounted display 100a is connected to an image data generation device 200a via a wireless LAN (Local Area Network), HDMI (registered trademark), or the like. The image data generation device 200a may also be connected to a server via networks such as WAN (World Area Network). In this case, the image data generation device 200a may download electronic content such as video games and moving images from the server. In the configuration illustrated in (b), a head-mounted display 100b is connected to an image data generation device 200b via a network 160 such as WAN.

Note that the image data generation device 200a may be an information processing device which is owned by an individual and which has functions other than generation of images, such as a game console or a personal computer. Further, the image data generation device 200b may be a server configured to distribute electronic content to clients via the network 160, such as a game server, a moving image distribution server, or a cloud server. Those are hereinafter collectively referred to as an "image data generation device 200." A communication mode between the image data generation device 200 and the head-mounted display 100, as well as the number of the head-mounted displays 100 connected to the image data generation device 200, for example, are not particularly limited.

The image data generation device 200 identifies a viewpoint position and a line-of-sight direction on the basis of the position and the orientation of the head-mounted display 100, and by extension, the position and the orientation of the head of the user wearing the head-mounted display 100. The image data generation device 200 generates a display image in a field of view corresponding to the viewpoint position and the line-of-sight direction and transfers the display image to the head-mounted display 100 by streaming. In this regard, the purpose of displaying images can be diverse. For example, the image data generation device 200 may generate, as a display image, a virtual world in which an electronic game is set while facilitating the progress of the electronic game, or an image for watching or providing information. In any case, the image data generation device 200 draws an image representing a three-dimensional space in a field of view corresponding to the viewpoint of the user wearing the head-mounted display 100.

FIG. 3 is a diagram illustrating an exemplary image world displayed by the head-mounted display 100 under control of the image data generation device 200 in the present embodiment. In this example, a state in which a user 12 is in a room that is a virtual space is created. Objects such as walls, a floor, windows, a table, and items on the table are arranged in a world coordinate system defining the virtual space, as illustrated in FIG. 3. The image data generation device 200 defines a view screen 14 in the world coordinate system in question in response to the viewpoint position and the line-of-sight direction of the user 12 and represents the silhouette images of the objects on the view screen 14, thereby drawing a display image.

The viewpoint position and the line-of-sight direction of the user 12 (these are hereinafter collectively referred to as the "viewpoint" in some cases) are acquired at a predetermined rate, and the position and the direction of the view screen 14 are changed accordingly, thereby making it possible to display an image in a field of view corresponding to the user's viewpoint. Stereo images with parallax are generated to be displayed in the respective left and right regions of the display panel, thereby making it also possible to stereoscopically visualize a virtual space. This allows the user 12 to experience a virtual reality as if he/she were inside the room in the display world.

Figure 4:
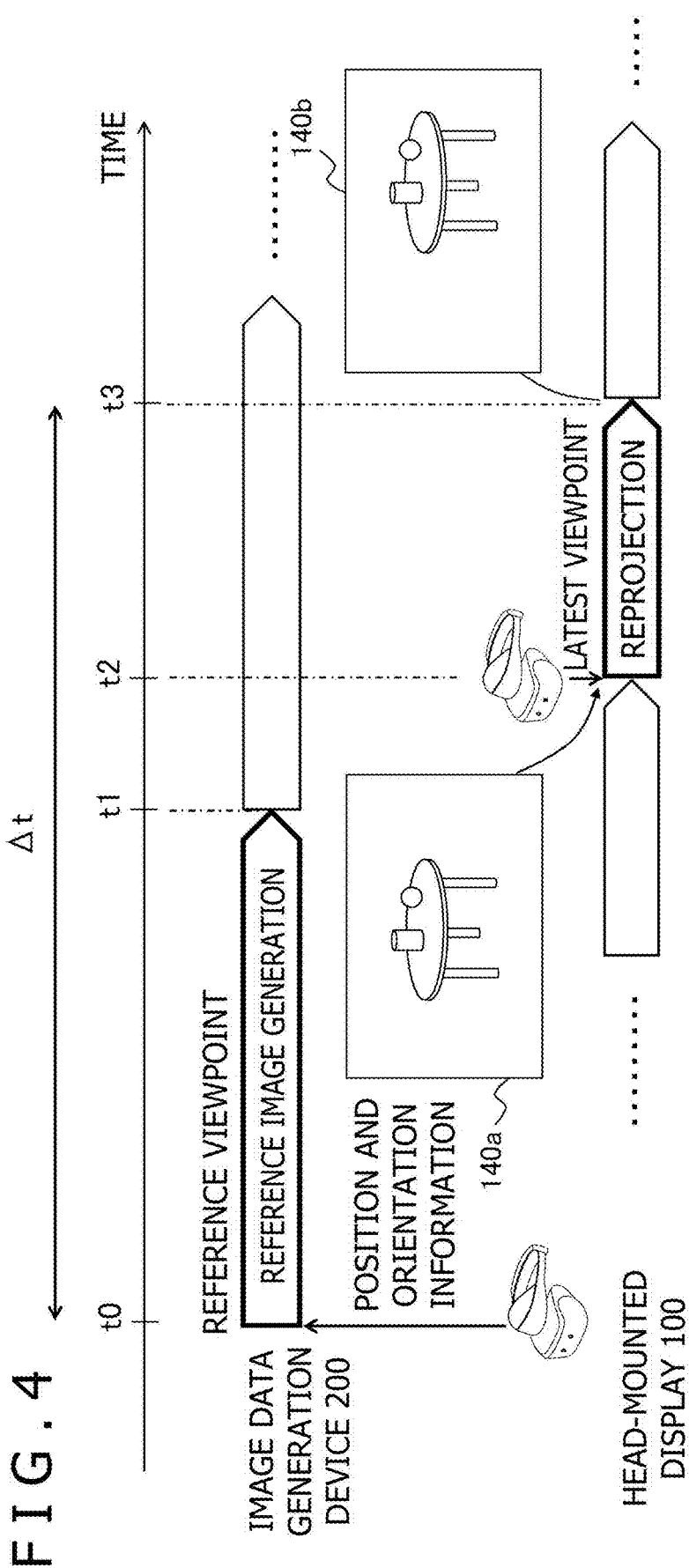
FIG. 4 is a diagram exemplifying progresses of generation processing for each frame in the image data generation device and display processing in the head-mounted display in the present embodiment.

To achieve such an aspect, the image data generation device 200 repeats a series of processes including acquiring information associated with the position and orientation of the head-mounted display 100 in real-time, generating the corresponding image (a frame of a moving image), and transmitting the image to the head-mounted display. FIG. 4 exemplifies states of the progresses of generation processing for each frame in the image data generation device 200 and display processing in the head-mounted display 100.

FIG. 4 illustrates, with respect to a common time axis in the horizontal direction, image generation processing in the image data generation device 200 in the upper section and display processing in the head-mounted display 100 in the lower section, with each frame indicated by a single pentagonal arrow. In this example, the image data generation device 200 generates frames at a rate lower than the frame rate of display on the head-mounted display 100. As an example, in a case where the display rate is 120 fps, the image data generation device 200 generates and transmits frames at 60 fps. With the frame generation cycle longer than the display update cycle, it is possible to take time for generating high-quality images while reducing the overall bit rate.

However, the frame rate relation in the present embodiment is not limited to this, and the same rate may be set for generation and display. In any case, there is a time lag between the generation and display of each frame, and the time lag increases as the generation rate is reduced as illustrated in FIG. 4, or as the data transfer time increases depending on transmission modes. Thus, in the head-mounted display 100, an image is corrected so as to correspond to the user's viewpoint just before display, thereby making it possible to reduce the influence of time lag. Such correction for accommodating viewpoint changes is referred to as "reprojection."

In the example of FIG. 4, first, the image data generation device 200 determines the viewpoint of an image to be generated, on the basis of position and orientation information acquired from the head-mounted display 100 at time t0. Then, until time t1, the image data generation device 200 generates an image 140a in the corresponding field of view and sequentially transmits the image 140a to the head-mounted display 100. The head-mounted display 100 performs reprojection on the transmitted image by taking into account the position and the orientation at that point in time (time t2) and outputs the resultant to the display panel at time t3. In this example, as a result of reprojection corresponding to a leftward viewpoint movement on the transmitted image 140*a*, an image 140*b* with the objects on the table moved toward the right is displayed.

The viewpoint change that has occurred between the times t0 and t2 is absorbed through reprojection processing in this way, thereby making it possible to continuously display the image with a small delay relative to the user's movement. This makes it possible to set the frame generation rate independently of the display rate, thereby obtaining effects such as an improvement in image quality and a reduction in bit rate as described above. Hereinafter, an image generated by the image data generation device 200 is referred to as a "reference image," a viewpoint set in reference image generation is referred to as a "reference viewpoint," and a viewpoint set by the head-mounted display 100 during reprojection is referred to as a "latest viewpoint."

Note that the image data generation device 200 sequentially sets reference viewpoints at time steps corresponding to the frame generation rate, such as the times t0, t1, and the like. Data serving as the basis for the settings may vary depending on the type of display device, display purpose, or the like, as long as the data is information indicating viewpoint changes. For example, position and orientation information regarding the head-mounted display 100 may be used as illustrated in FIG. 4, or the content of user operations related to viewpoint changes input through an input device, which is not illustrated, may be acquired. Alternatively, information regarding viewpoints determined by applications such as game programs according to user operations may be acquired. Those are collectively regarded as "information associated with viewpoint changes." Regarding the latest viewpoint, viewpoints are determined on the basis of any of those pieces of information at time steps corresponding to the display frame rate, as a matter of course.

Figure 5:
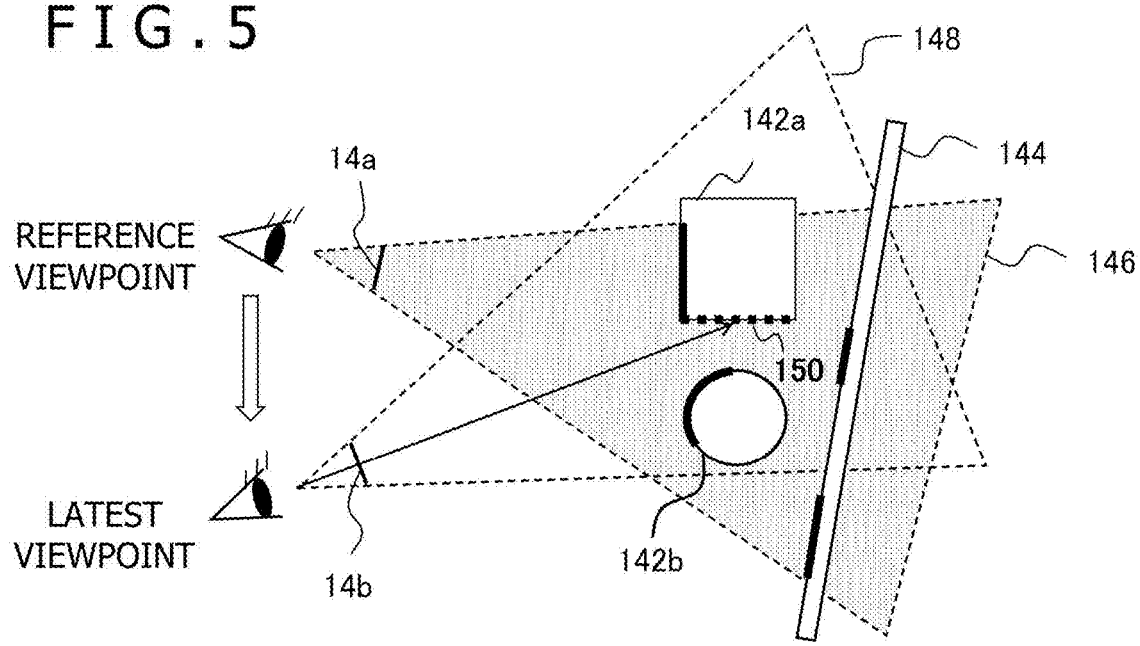
FIG. 5 is a diagram illustrating changes in image due to a viewpoint change in the present embodiment.

FIG. 5 is a diagram illustrating image changes due to a viewpoint change. FIG. 5 is a bird's-eye view of a three-dimensional space that is a display target, in which objects 142*a* and 142*b* and a background 144 are arranged, as well as viewpoints. Here, when it is assumed that a shaded region 146 which serves as a view frustum indicates the field of view from a reference viewpoint, the image data generation device 200 generates a reference image representing a state in which the objects being present inside the region 146 are projected onto a view screen 14*a*. That is, in the reference image, the silhouette images of the surfaces indicated by the bold lines of the objects 142*a* and 142*b* and the background 144 are represented.

In a case where the viewpoint moves as indicated by the arrow, a change is made to a region 148, which serves as a view frustum corresponding to the latest viewpoint. Thus, changes in the silhouette images projected onto a view screen 14*b* include not only movement and deformation but also the appearance of an occluded part in some cases. In the example of FIG. 5, for example, a dashed line surface 150 of the object 142*a*, which is occluded from the reference viewpoint, becomes visible. The appearance of an occluded part due to a viewpoint change as described above is referred to as "disocclusion." Disocclusion occurs not only for another surface of the single object 142*a* but also for objects or backgrounds behind foreground objects.

In a case where disocclusion occurs at the latest viewpoint, since the reference image does not include information regarding the part in question, it is impossible to achieve accurate representation through transformation of a simple silhouette image. That is, when translation and rotation transformations are applied to a silhouette image represented in the reference image, a generally-called "hole" part in which pixel values cannot be determined is generated. As a countermeasure for this, it is conceivable to partially draw an image from the latest viewpoint to fill in the hole in the head-mounted display 100.

However, in this case, for the drawing in question, there arises a need to transmit spatial information regarding the display target, model data on each object, and the like from the image data generation device 200 to the head-mounted display 100. For example, in a system configured to display a high-definition image through ray tracing, it is necessary to transmit all geometry information, texture data, light source information, material information, and the like regarding a space to the head-mounted display 100. This results in an increase in transmission data size and long reprojection time, leading to an increase in delay time before display.

Thus, in the present embodiment, the image data generation device 200 speculatively generates color information regarding a part in which disocclusion may occur. That is, the image data generation device 200 partially draws an image from a viewpoint other than a reference viewpoint, adds pixel values or color information regarding the image to the reference image data, and transmits the resultant to the head-mounted display 100. In reprojection processing, the head-mounted display 100 corrects the transmitted reference image on the basis of the latest viewpoint and determines the pixel values of a part in which disocclusion has occurred, by use of the additionally transmitted color information.

In a general environment, the proportion of an area in which disocclusion occurs relative to the entire image is slight, and the increase in data size is a few percent or less. Thus, as compared to a case where entire model data is transmitted to be drawn on the head-mounted display 100 side, the influence on data transfer time is significantly reduced. Further, by generating additional information by the image data generation device 200 with abundant resources, the influence on required time due to speculative processing is also reduced. Moreover, since an increase in processing load on the head-mounted display 100 is avoidable, the present invention is easily achieved even with the head-mounted display 100 with low processing performance. Hereinafter, color information additionally generated by the image data generation device 200 is referred to as "additional sampling data," and a viewpoint other than a reference viewpoint, which is set to generate additional sampling data, is referred to as an "additional viewpoint."

Figure 6:
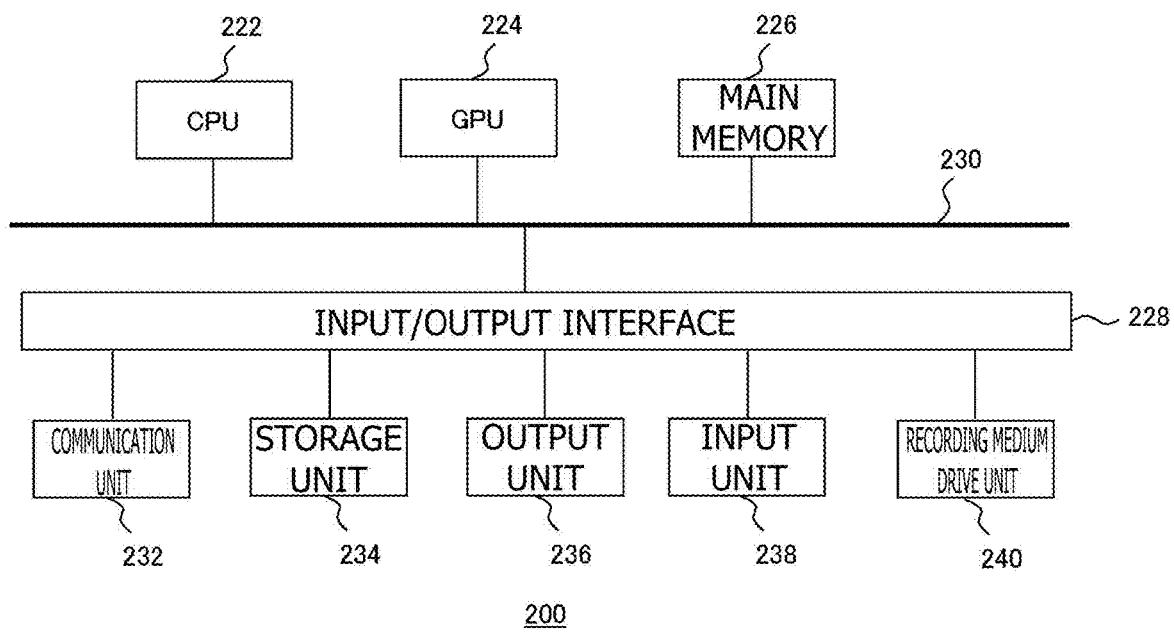
FIG. 6 is a diagram illustrating an internal circuit configuration of the image data generation device in the present embodiment.

FIG. 6 illustrates an internal circuit configuration of the image data generation device 200. The image data generation device 200 includes a CPU (Central Processing Unit) 222, a GPU (Graphics Processing Unit) 224, and a main memory 226. These components are connected to each other via a bus 230. The bus 230 is also connected to an input/output interface 228.

The input/output interface 228 is connected to the following: peripheral device interfaces, such as USB and IEEE 1394; a communication unit 232 including a wired or wireless LAN network interface; a storage unit 234 such as a hard disk drive or a nonvolatile memory; an output unit 236 configured to output data to, for example, a display device which is not illustrated; an input unit 238 configured to receive data from, for example, an input device which is not illustrated; and a recording medium drive unit 240 configured to drive removable recording media, such as magnetic disks, optical discs, or semiconductor memories.

The CPU 222 executes the operating system stored in the storage unit 234 to control the entire image data generation device 200. The CPU 222 also executes various programs read from removable recording media and loaded into the main memory 226 or programs downloaded via the communication unit 232. The GPU 224 has a geometry engine function and a rendering processor function and performs image drawing processing according to drawing instructions from the CPU 222. The main memory 226 includes a RAM (Random Access Memory) and stores programs and data necessary for processing.

Figure 7:
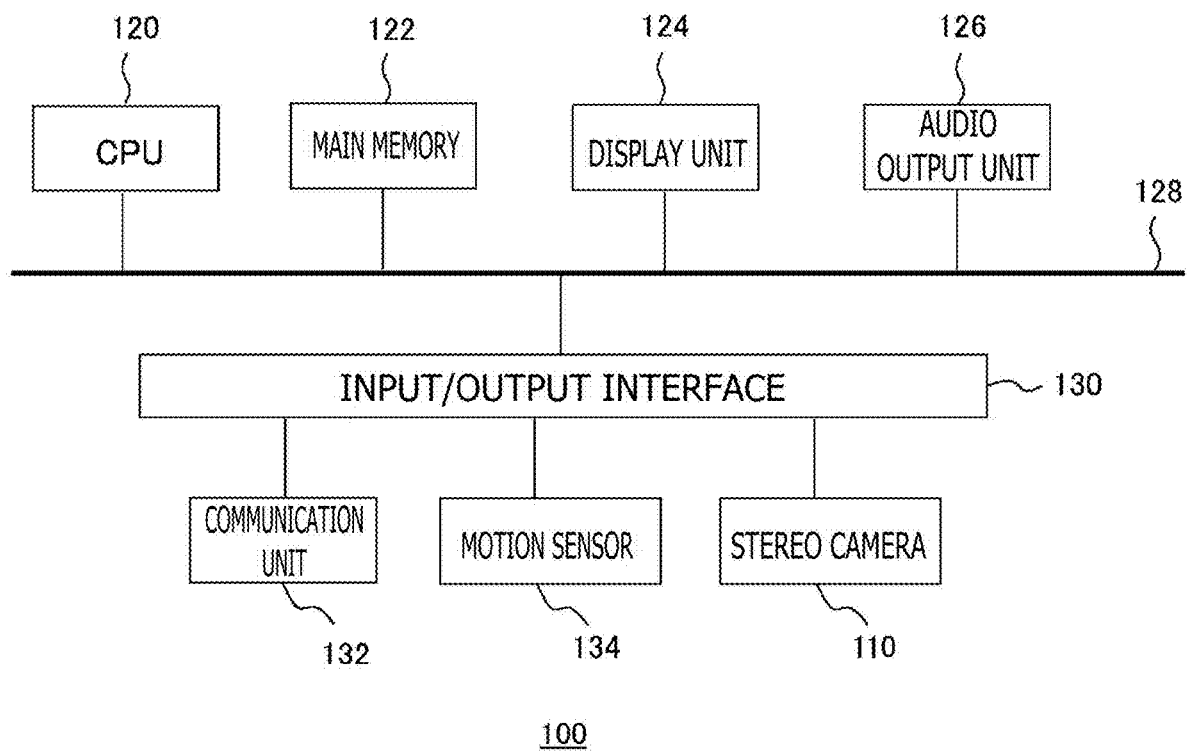
FIG. 7 is a diagram illustrating an internal circuit configuration of the head-mounted display in the present embodiment.

FIG. 7 illustrates an internal circuit configuration of the head-mounted display 100. The head-mounted display 100 includes a CPU 120, a main memory 122, a display unit 124, and an audio output unit 126. These components are connected to each other via a bus 128. The bus 128 is also connected to an input/output interface 130. The input/output interface 130 is connected to a communication unit 132 including a wired or wireless LAN network interface, a motion sensor 134, and the stereo camera 110.

The CPU 120 processes information acquired from each component of the head-mounted display 100 via the bus 128 and supplies a display image and audio data acquired from the image data generation device 200 to the display unit 124 and the audio output unit 126. The main memory 122 stores programs and data necessary for processing by the CPU 120. The display unit 124 includes a display panel such as a liquid crystal panel or an organic EL panel and displays images in front of the eyes of the user wearing the head-mounted display 100. As described above, a pair of parallax images may be displayed in regions corresponding to the left and right eyes, thereby achieving a stereoscopic view.

The audio output unit 126 includes speakers or earphones provided at positions that are to be aligned with the user's ears when he/she wears the head-mounted display 100 and allows the user to hear sounds. The communication unit 132 is an interface for transmitting and receiving data to and from the image data generation device 200 and establishes communications by use of known communication technology. Image data transmitted from the image data generation device 200 is displayed on the display unit 124 via the communication unit 132 under the control of the CPU 120.

The motion sensor 134 includes a gyroscope sensor and an acceleration sensor and acquires the angular velocity and acceleration of the head-mounted display 100 at a predetermined rate. The stereo camera 110 is, as illustrated in FIG. 1, a pair of video cameras configured to capture, from left and right viewpoints, a surrounding real space in a field of view corresponding to the user's viewpoint. Measured values from the motion sensor 134, captured image data from the stereo camera 110, or data related to the position and the orientation of the head-mounted display 100 obtained from those is transmitted to the image data generation device 200 through the communication unit 132 at a predetermined rate.

Figure 8:
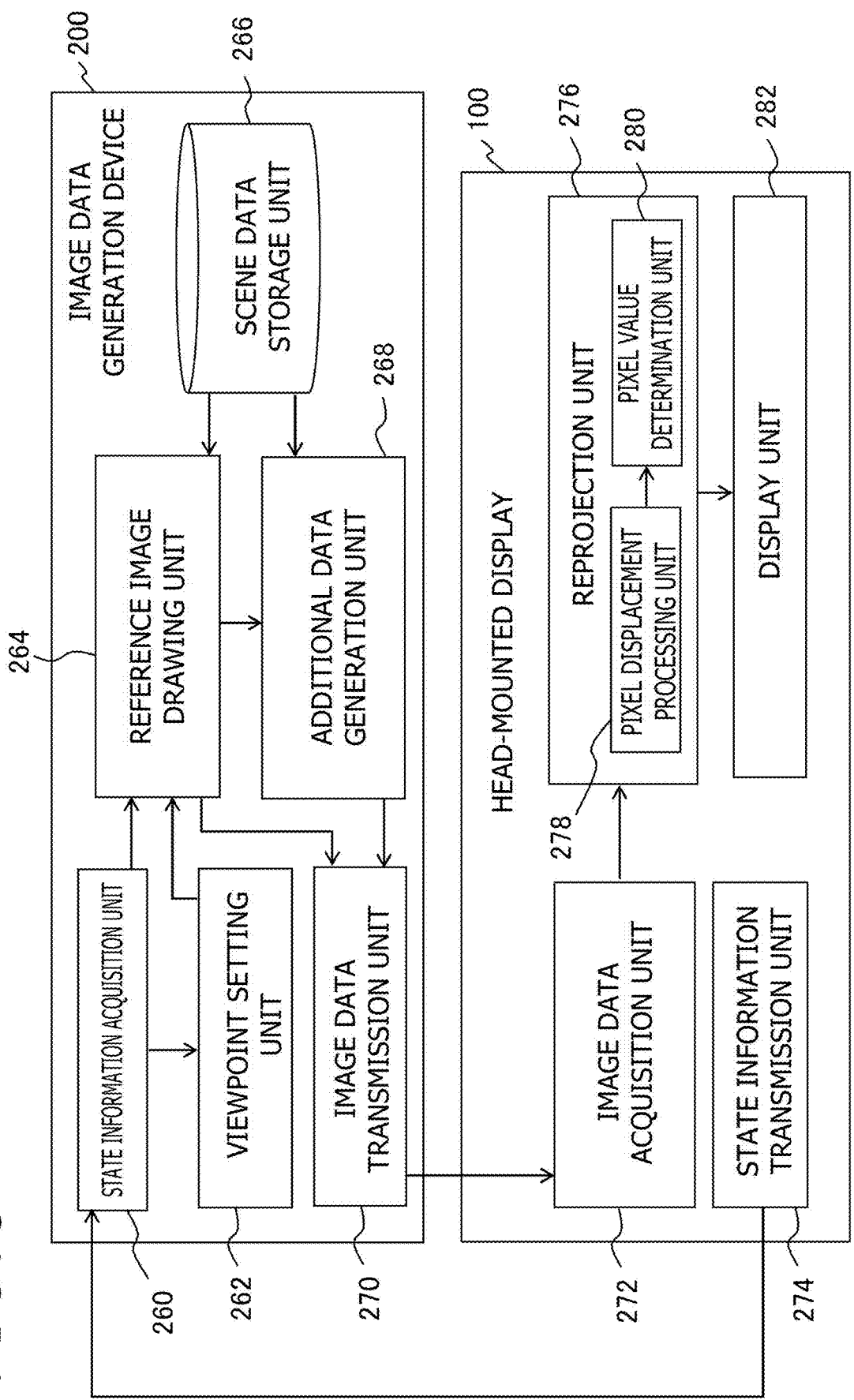
FIG. 8 is a diagram illustrating configurations of functional blocks of the image data generation device and the head-mounted display in the present embodiment.

FIG. 8 illustrates configurations of functional blocks of the image data generation device 200 and the head-mounted display 100 in the present embodiment. As described above, the image data generation device 200 may perform general information processing for facilitating the progresses of electronic games or distributing moving images. In FIG. 8, the image data generation device 200 is illustrated with particular emphasis on its display image generation function.

Further, the functional blocks illustrated in FIG. 8 can be hardware-implemented by the CPU, the GPU, the various memories, the sensors, or the like illustrated in FIG. 6 or FIG. 7, or can be software-implemented by programs loaded from the recording media or the like into the memory, for performing various functions such as a data input function, a data retaining function, an image processing function, and a communication function. Thus, it is to be understood by those skilled in the art that these functional blocks can be implemented by hardware only, software only, or a combination thereof, and the present invention is not limited to any of them.

The image data generation device 200 includes a state information acquisition unit 260 configured to acquire information associated with the position and the orientation of the head-mounted display 100, a viewpoint setting unit 262 configured to set a reference viewpoint, a reference image drawing unit 264 configured to draw a reference image, an additional data generation unit 268 configured to generate additional sampling data, a scene data storage unit 266 configured to store model data on a scene that is a display target, and an image data transmission unit 270 configured to transmit generated image data to the head-mounted display 100.

The state information acquisition unit 260 acquires data on measured values from the motion sensor, captured images from the stereo camera 110, and the like from the head-mounted display 100 and calculates the position and the orientation of the head-mounted display 100 at a predetermined rate. Note that position and orientation information may be calculated on the head-mounted display 100 side, and the state information acquisition unit 260 may acquire the position and orientation information at the predetermined rate. The viewpoint setting unit 262 sets the viewpoint position and the line-of-sight direction with respect to a space that is a display target which correspond to the position and the orientation acquired by the state information acquisition unit 260, as a reference viewpoint at a predetermined rate. Note that the viewpoint setting unit 262 may predict the viewpoint position and the line-of-sight direction at the timing of image display on the head-mounted display 100 on the basis of the history of previous viewpoint movements and set these as a reference viewpoint.

The reference image drawing unit 264 draws a reference image representing a space that is a display target in the field of view from a reference viewpoint set by the viewpoint setting unit 262, at a predetermined rate. This image may be a result of information processing in a video game or the like. The scene data storage unit 266 stores data on object models necessary for image drawing and information associated with the progress of scenes. The reference image drawing unit 264 draws a reference image by use of data stored in the scene data storage unit 266, as well as captured image data transmitted from the head-mounted display 100 as needed.

The reference image drawing unit 264 preferably draws a reference image through ray tracing which includes determining intersections between light beams (rays) traveling from a reference viewpoint to pass through the respective pixels on the view screen and objects, as well as acquiring color information through physical calculations based on light reflection characteristics. This makes it possible to draw a high-definition image that accurately reflects object surface materials, the state of light sources, and the like. On this occasion, the reference image drawing unit 264 also generates information regarding the depth to the object surface represented by each pixel, that is, a distance value in the depth direction. In a case where ray tracing is used for image drawing, depth information can easily be acquired through ray intersection determination.

Depth information is used for reprojection in the head-mounted display 100. As a technology for correcting a certain image to an image seen from a different viewpoint by use of depth information, 3D warping is known (for example, see Andre Schollmeyer and four others, "Efficient Hybrid Image Warping for High Frame-Rate Stereoscopic Rendering," IEEE Transactions on Visualization and Computer Graphics, Jan. 25, 2017, Vol. 23, Issue 4, p. 1332-1341, and Niko Wismann and three others, "Accelerated Stereo Rendering with Hybrid Reprojection-Based Rasterization and Adaptive Ray-Tracing," 2020 IEEE Conference on Virtual Reality and 3D User Interfaces (VR), Mar. 22, 2020, p. 828-835).

In the above-mentioned documents, 3D warping is used for the purpose of generating one image from the other image of stereo images. On the other hand, in the present embodiment, this technology is applied to reprojection in the head-mounted display 100. That is, each pixel is inverse projected into a virtual three-dimensional space once by use of depth information and projected again onto a view screen corresponding to the latest viewpoint just before display, thereby performing reprojection.

On this occasion, instead of projecting all the pixels again, projective transformation is performed in units of small regions (hereinafter referred to as a "patch") obtained by dividing the image plane according to a predetermined rule, and the pixel values inside the patches are determined through procedures similar to texture mapping, thereby making it possible to increase the processing efficiency. In the above-mentioned documents, an image before warping is divided such that a part with a discontinuous depth change, such as an object contour portion, is included in a patch with the minimum area and such that patches farther from that part have larger areas. This makes it possible to achieve finer transformations for contour lines and the like greatly affected by viewpoint changes. Such a technology is called adaptive grid warping.

Also in the present embodiment, adaptive grid warping is applied to efficiently perform 3D warping, thereby making it possible to achieve display with a smaller delay. In this case, the reference image drawing unit 264 first acquires a depth for each pixel in a reference image and then divides the image plane into patches with different areas according to spatial changes in depth. Qualitatively, as described above, patches closer to a part with a discontinuous depth change have smaller areas. Information serving as the basis for patch area control may be depth, edge extraction results in the reference image, geometry information regarding the display space, or the like. Then, the reference image drawing unit 264 extracts depth information at the vertices of each patch and sets the depth information as a transmission target.

The additional data generation unit 268 extracts a part in a reference image in which disocclusion may occur and acquires color information regarding that part at a predetermined rate as additional sampling data. For example, the additional data generation unit 268 sets an additional viewpoint at a position shifted from the reference viewpoint according to a predetermined rule, extracts a part in the display target space visible from the additional viewpoint that is not represented in the reference image, and then acquires color information regarding the part in question.

An additional viewpoint may be set by predicting the viewpoint of the same frame during reprojection in the head-mounted display 100, that is, the latest viewpoint, from the history of previous reference viewpoint changes. In this case, the additional data generation unit 268 identifies the time difference between the time at which the reference viewpoint is set and the time at which the latest viewpoint is set in the head-mounted display 100 through handshaking with the head-mounted display 100 or the like. Then, the additional data generation unit 268 predicts the latest viewpoint through the extrapolation of the time difference in question in terms of the temporal reference viewpoint change and sets the latest viewpoint as an additional viewpoint.

Alternatively, the additional data generation unit 268 may first identify, on the basis of the shape of an object represented in a reference image, a part of the object in question that is likely to be visible shortly and set a viewpoint from which the part in question is visible as an additional viewpoint. Here, the part of the object that is likely to be visible shortly is likely to be located near the contours of the silhouette image in the reference image. In a case where adaptive grid warping is applied, patches with the minimum area are formed near the contours of a silhouette image. By utilizing this, the additional data generation unit 268 may treat a part on an object corresponding to a region with a patch having an area equal to or smaller than a predetermined value and acquire color information regarding the part in question seen from another viewpoint. Note that, also in a case where the latest viewpoint is predicted to be set as an additional viewpoint, the contour region of a silhouette image in a reference image may be similarly extracted, and color information regarding the corresponding part on the object may be acquired.

In any case, on the basis of data stored in the scene data storage unit 266, the additional data generation unit 268 draws a partial image seen from an additional viewpoint through ray tracing, thereby being capable of also generating detailed and accurate color information regarding additional sampling data. The additional data generation unit 268 generates, as additional sampling data, position information regarding an additional viewpoint, partial color information from the viewpoint in question, and depth information regarding that part. Note that one or a plurality of additional viewpoints may be set.

The image data transmission unit 270 sequentially transmits reference images drawn by the reference image drawing unit 264 and additional sampling data generated by the additional data generation unit 268 to the head-mounted display 100 in association with each other. Note that, in a case where stereoscopic images are displayed on the head-mounted display 100, the reference image drawing unit 264 and the additional data generation unit 268 perform similar processing for both left-eye and right-eye images. Alternatively, the reference image drawing unit 264 and the additional data generation unit 268 may generate data on one of left-eye and right-eye images or data on an image from an intermediate viewpoint and then generate the final stereo image by use of 3D warping in the head-mounted display 100.

The head-mounted display 100 includes a state information transmission unit 274 configured to transmit information associated with position and orientation to the image data generation device 200, an image data acquisition unit 272 configured to acquire image data transmitted from the image data generation device 200, a reprojection unit 276 configured to generate a display image through reprojection, and a display unit 282 configured to display an image after reprojection.

The state information transmission unit 274 includes at least any one of the stereo camera 110 and the motion sensor 134 of FIG. 7 and transmits data on captured images or measured values to the image data generation device 200 at a predetermined rate. Alternatively, the state information transmission unit 274 may calculate the position and orientation of the head-mounted display 100 from those pieces of data and then transmit the data in question to the image data generation device 200. The image data acquisition unit 272 acquires reference image data and additional sampling data transmitted from the image data generation device 200 at a predetermined rate.

The reprojection unit 276 includes at least any one of the stereo camera 110 and the motion sensor 134 of FIG. 7. The reprojection unit 276 identifies the latest position and orientation of the head-mounted display 100 to set the latest viewpoint and matches the reference image with the latest viewpoint through reprojection. Specifically, the reprojection unit 276 includes a pixel displacement processing unit 278 and a pixel value determination unit 280. The pixel displacement processing unit 278 determines the displacement destinations of the pixels in a reference image, which correspond to a change from the reference viewpoint to the latest viewpoint. That is, according to the depth information, the pixel displacement processing unit 278 inverse projects the pixels in the reference image into a three-dimensional space once and then projects the pixels again onto a view screen corresponding to the latest viewpoint. With 3D warping as described above, the vertices of patches are first displaced, and the displacement destinations of the pixels inside the patches are determined according to UV coordinates.

The pixel value determination unit 280 refers to color values at corresponding positions in a reference image, thereby determining the pixel values of the display image on the basis of the positional relation of pixels before and after displacement. The processing by the pixel displacement processing unit 278 and the pixel value determination unit 280 described above can generally be achieved similarly to texture mapping using a reference image as a texture. However, the pixel value determination unit 280 incorporates additional sampling data into a reference, thereby more accurately determining image values. That is, for patches that are enlarged due to a viewpoint change, additional sampling data is inserted at appropriate positions to artificially improve the resolution of the patches in the reference.

This makes it possible to prevent phenomena such as inappropriate enlargement of silhouette images or blurred contours. Besides this, the reprojection unit 276 may appropriately perform stereo image generation, correction considering eyepiece lens distortion, chromatic aberration correction, or the like. The display unit 282 sequentially displays, on the display panel, display images each corresponding to the latest viewpoint, which have been generated through reprojection by the reprojection unit 276.

Figure 9:
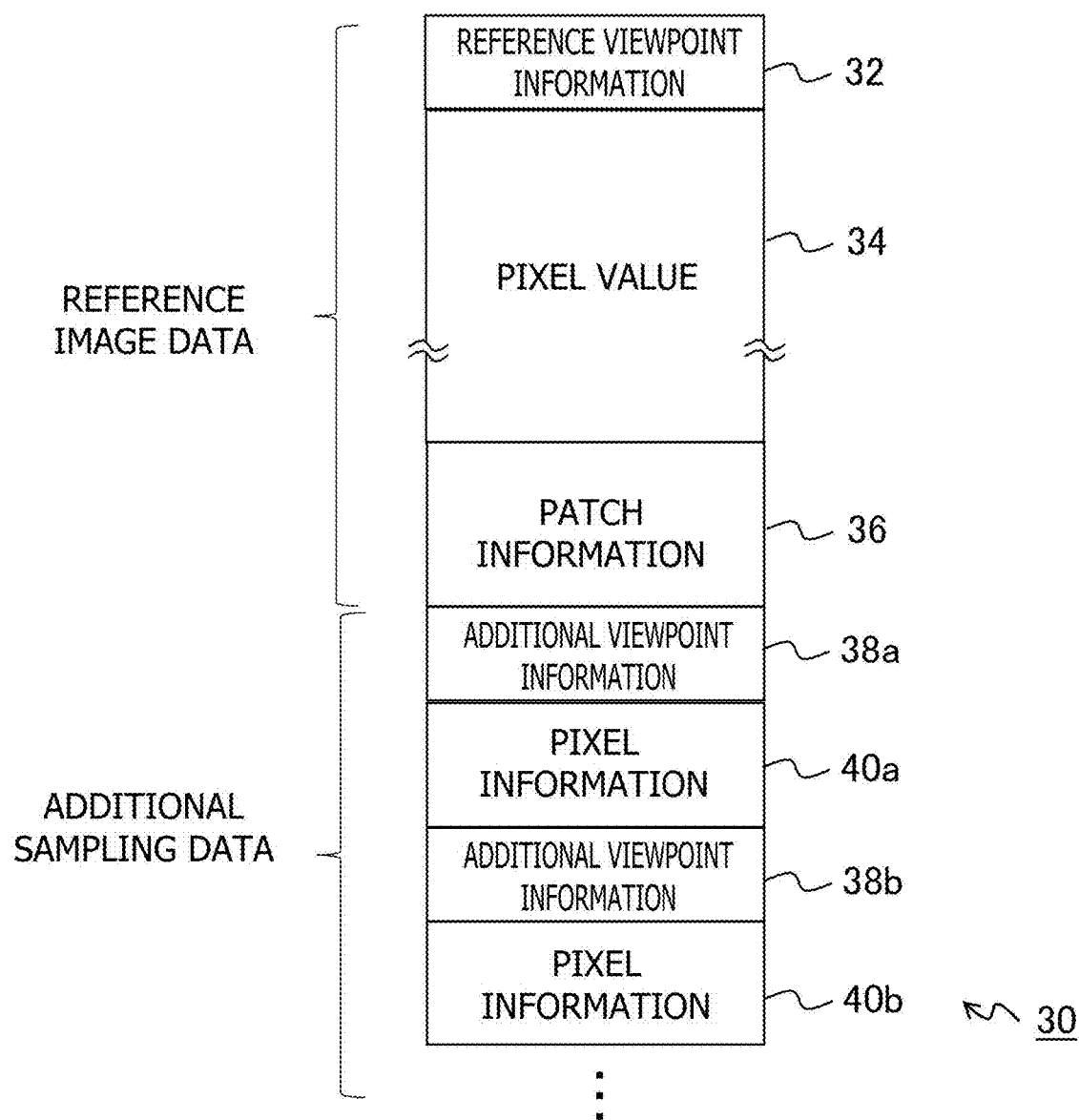
FIG. 9 is a diagram illustrating a structure example of image data transmitted from the image data generation device to the head-mounted display in the present embodiment.

FIG. 9 illustrates a structure example of image data transmitted from the image data generation device 200 to the head-mounted display 100. Image data 30 illustrated in FIG. 9 represents data on a single frame generated by the image data generation device 200 and includes reference image data and additional sampling data. Note that FIG. 9 only illustrates the types of information included in image data on a single frame and does not define the order of data transmission from the image data generation device 200 to the head-mounted display 100.

Reference image data includes reference viewpoint information 32, a pixel value 34, and patch information 36. The reference viewpoint information 32 indicates the position coordinates in three-dimensional space of a reference viewpoint set when a reference image is drawn. The pixel value 34 indicates the values of all the pixels in a drawn reference image, that is, color information, in the order of pixel rows. The patch information 36 indicates position information regarding patches obtained by dividing an image plane and includes, for example, position coordinates and depth in the image plane of each vertex.

Additional sampling data includes additional viewpoint information 38a or 38b and pixel information 40a or 40b for each additional viewpoint. The additional viewpoint information 38a or 38b indicates the position coordinates in three-dimensional space of an additional viewpoint. The pixel information 40a or 40b includes color information regarding a point on an object seen from an additional viewpoint and position information regarding the point in question. Here, "point" corresponds to a single pixel on a view screen corresponding to an additional viewpoint and is a part on an object that intersects with a ray in ray tracing.

Position information regarding a point may be represented by position coordinates and depth on a view screen corresponding to an additional viewpoint or by position coordinates in a three-dimensional space. In the latter case, the use of position information regarding an additional viewpoint may be omitted. The number of additional viewpoints and the number of points for which color information for a single additional viewpoint is acquired are not particularly limited. Considering that, strictly speaking, the same point on an object exhibits different colors depending on line-of-sight angles, an additional viewpoint closer to the latest viewpoint allows for a more accurate representation of disocclusion parts. On the other hand, the fewer the additional viewpoints or points for which color information is acquired, the lighter the processing load. Thus, the number of additional viewpoints and points may be optimized in accordance with the required accuracy for display, the processing performance, communication bandwidth, and viewpoint change prediction accuracy of the image data generation device 200, or the like.

Figure 10:
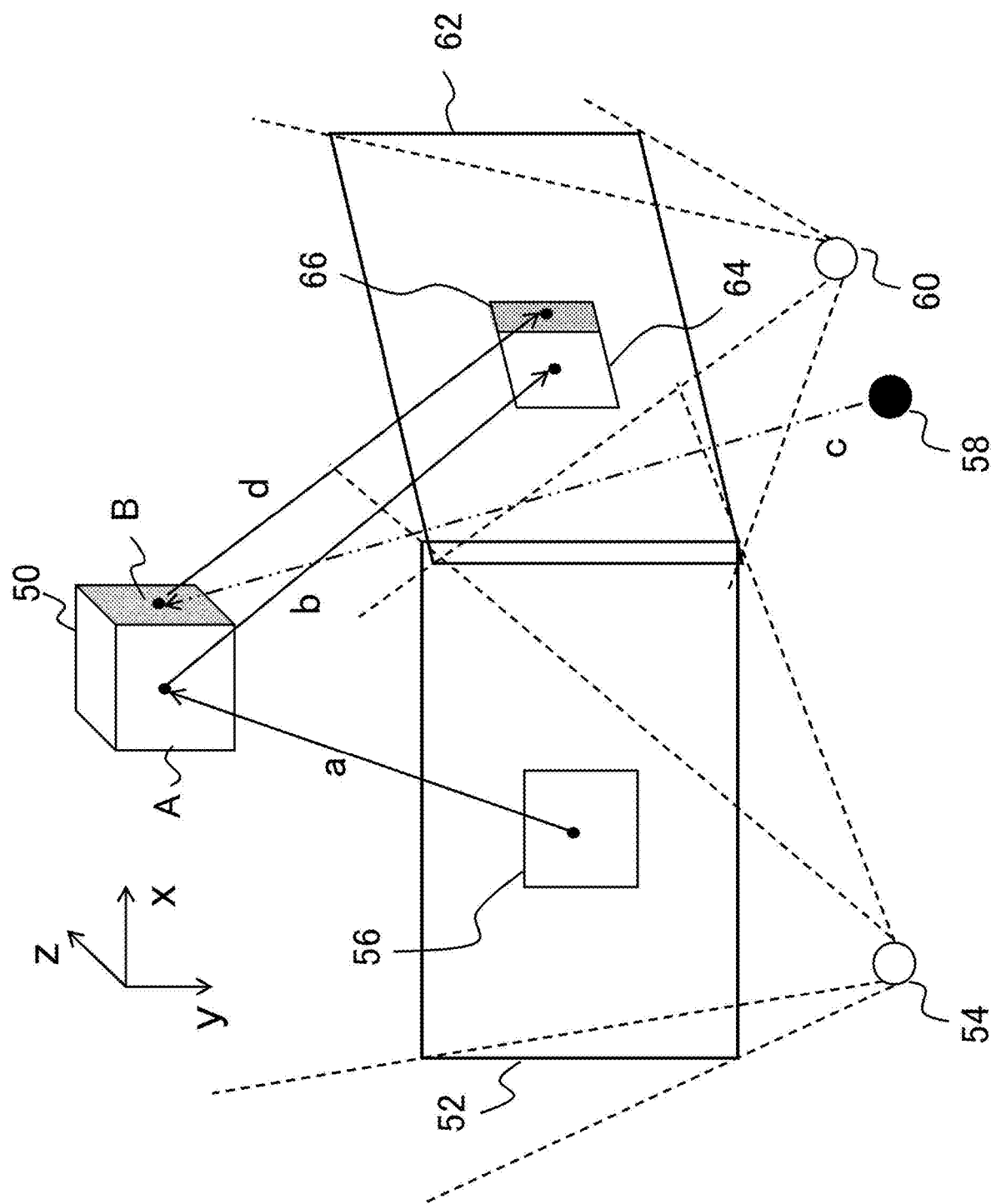
FIG. 10 is a diagram illustrating a concept of a technique for generating display images by a reprojection unit of the head-mounted display in the present embodiment.

FIG. 10 is a diagram illustrating the concept of a technique for generating display images by the reprojection unit 276 of the head-mounted display 100. In a reference image 52 transmitted from the image data generation device 200, a state in which an object 50 present in a three-dimensional space that is a display target is seen from a reference viewpoint 54 is drawn. In FIG. 10, a square silhouette image 56 is represented as a visible surface A of the cubic object 50. The image data generation device 200 acquires, in addition to the reference image 52, as additional sampling data, for example, color information regarding, of the silhouette image of the object 50 seen from an additional viewpoint 58, a surface B that is not visible from the reference viewpoint and transmits the color information in association with the reference image data.

In FIG. 10, a view screen corresponding to the additional viewpoint 58 is not illustrated for simplification, and as in ordinary ray tracing, it is only necessary to set a view screen and draw an image of a region in a display target space corresponding to a region in a predetermined range of the contour portions of the silhouette image 56. Alternatively, the three-dimensional position coordinates of a point at which a ray generated from the additional viewpoint 58 intersects with the surface B of the object 50 and color information obtained at that point may be used as additional sampling data. The reprojection unit 276 of the head-mounted display 100 sets a latest viewpoint 60 on the basis of the latest position and orientation and then changes the silhouette image 56 represented in the reference image 52 through 3D warping.

That is, according to the depth information, the surface A in three-dimensional space is virtually formed from the silhouette image 56 (for example, an arrow a) and projected again onto a view screen 62 corresponding to the latest viewpoint 60 (for example, an arrow b). With this, a silhouette image 64 of the surface A of the object 50 is formed on the view screen 62. The transformation from position coordinates on the reference image plane to three-dimensional position coordinates and the transformation from three-dimensional position coordinates to position coordinates on the view screen 62 can actually be calculated all at once with general transformation matrices. Further, as described above, the transformation of the vertices of patches obtained by dividing the reference image 52 is performed, and for the pixels inside the patches, the pixel values at the corresponding positions in the reference image 52 are sampled, thereby making it possible to determine the pixel values of the silhouette image 64 or the like.

On the other hand, in a case where the surface B of the object 50 is also visible from the latest viewpoint 60, the reprojection unit 276 uses the additional sampling data to form a silhouette image 66 of the surface B. In a case where, as additional sampling data, the silhouette image of the surface B is represented on the view screen corresponding to the additional viewpoint 58, warping including virtually forming the surface B in three-dimensional space according to the depth information and projecting the surface B onto the view screen 62 (for example, arrows c and d) is performed. In a case where the three-dimensional position coordinates on the surface B are associated with color information, that point is projected onto the view screen 62 (for example, an arrow d).

This makes it possible to accurately add information regarding the surface B of the object 50 which is not included in the reference image 52, through reprojection, thereby accurately displaying a high-definition image. Note that FIG. 10 exaggerates the size of the silhouette image 66 represented by the additional sampling data for clarity, but in actuality, the silhouette image 66 has a width of approximately a single pixel to several pixels. Thus, it becomes possible to achieve display with both responsiveness and quality without a significant change in the amount of data transmitted from the image data generation device 200 due to additional sampling data.

Figure 11:
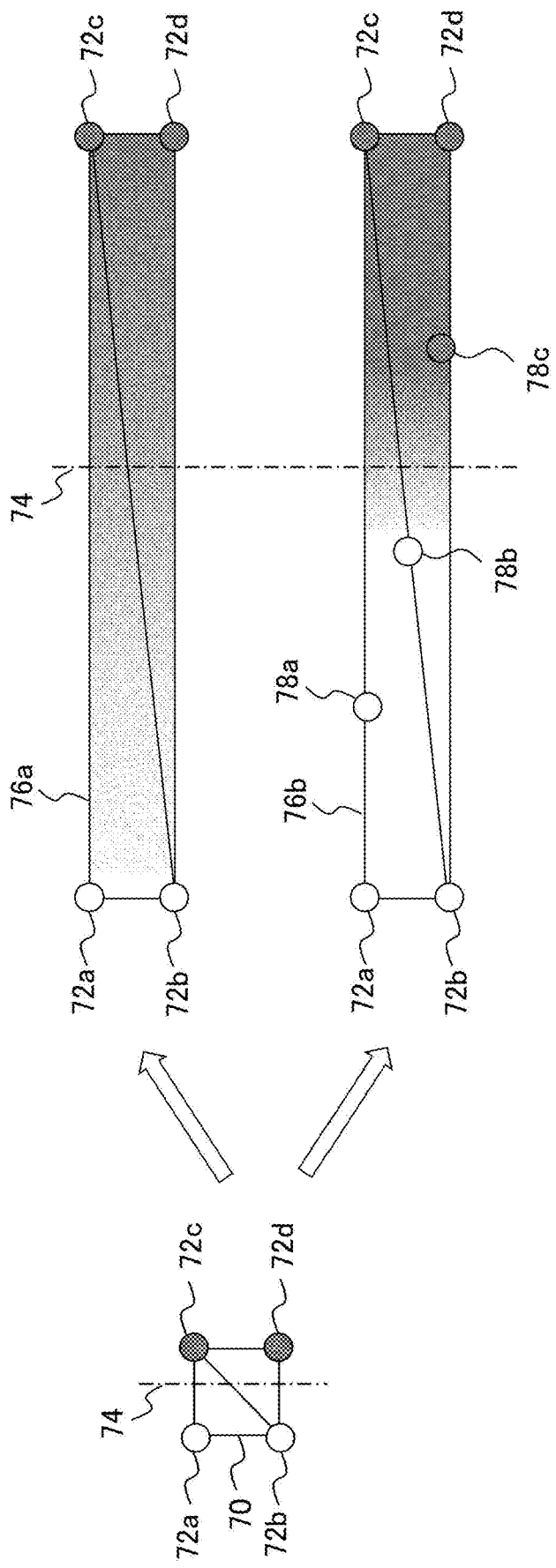
FIG. 11 is a diagram illustrating an effect of reprojection by use of additional sampling data at a pixel level in the present embodiment.

FIG. 11 is a diagram illustrating the effect of reprojection with use of additional sampling data at the pixel level. On the left side of FIG. 11, four pixels 72a, 72b, 72c, and 72d arranged in a 2×2 configuration in a reference image are illustrated. Among these, the pixels 72a and 72b represent the silhouette image of a white foreground object, while the pixels 72c and 72d represent the silhouette image of a gray background. In the reference image, the horizontally adjacent pixels 72a/72c or 72b/72d change in color significantly, and hence, an actual contour 74 of the object is visually recognized at the pixel level.

With 3D warping performed in the reprojection unit 276 of the head-mounted display 100, a region 70 surrounded by the four pixels 72a, 72b, 72c, and 72d that have been adjacent to each other in the reference image may be enlarged as illustrated on the right side of FIG. 11. That is, since the foreground silhouette image has a larger amount of displacement than the background silhouette image, regions 76a and 76b are horizontally enlarged due to a horizontal viewpoint movement. Note that, with adaptive grid warping as described above, the minimum patch is formed at the contours of an object. Thus, the region 70 corresponds to a patch before warping, and the regions 76a and 76b correspond to patches after warping.

Here, the region 76a indicates a color distribution determined after warping without no use of additional sampling data, and the region 76b indicates a color distribution determined after warping with use of additional sampling data. Note that, in actuality, in both cases, the pixel values of the pixel rows inside the regions are determined. In the case of the region 76a in which additional sampling data is not used, only the reference image is used to determine pixel values. From the reference image, only information indicating that the pixels 72a and 72b are white, while the pixels 72c and 72d are gray is obtained, and hence, a wide range of gradation is formed through filtering according to the distances from those four pixels. That is, along with the enlargement of the region, the color distribution is also enlarged, thereby making it more likely for color bleeding, which makes the background and the foreground seem as if blended, to appear.

On the other hand, in a case where, as additional sampling data, color information regarding points 78a, 78b, and 78c is used, the points 78a and 78b included on the object side of the actual contour 74 are controlled as white, while the point 78c included on the background side is controlled as gray. Thus, the range of color bleeding even after filtering can significantly be narrowed down. Although the example illustrated in FIG. 11 indicates the distribution of the two colors for the foreground and the background, also in a case where a third color appears due to a newly revealed surface or the like, the color in question can be represented at the corresponding position as a matter of course, as illustrated in FIG. 10. As a result, deteriorations in image quality, such as enlargement of the original silhouette image and blurring of boundaries with other objects can be prevented through reprojection.

Figure 12:
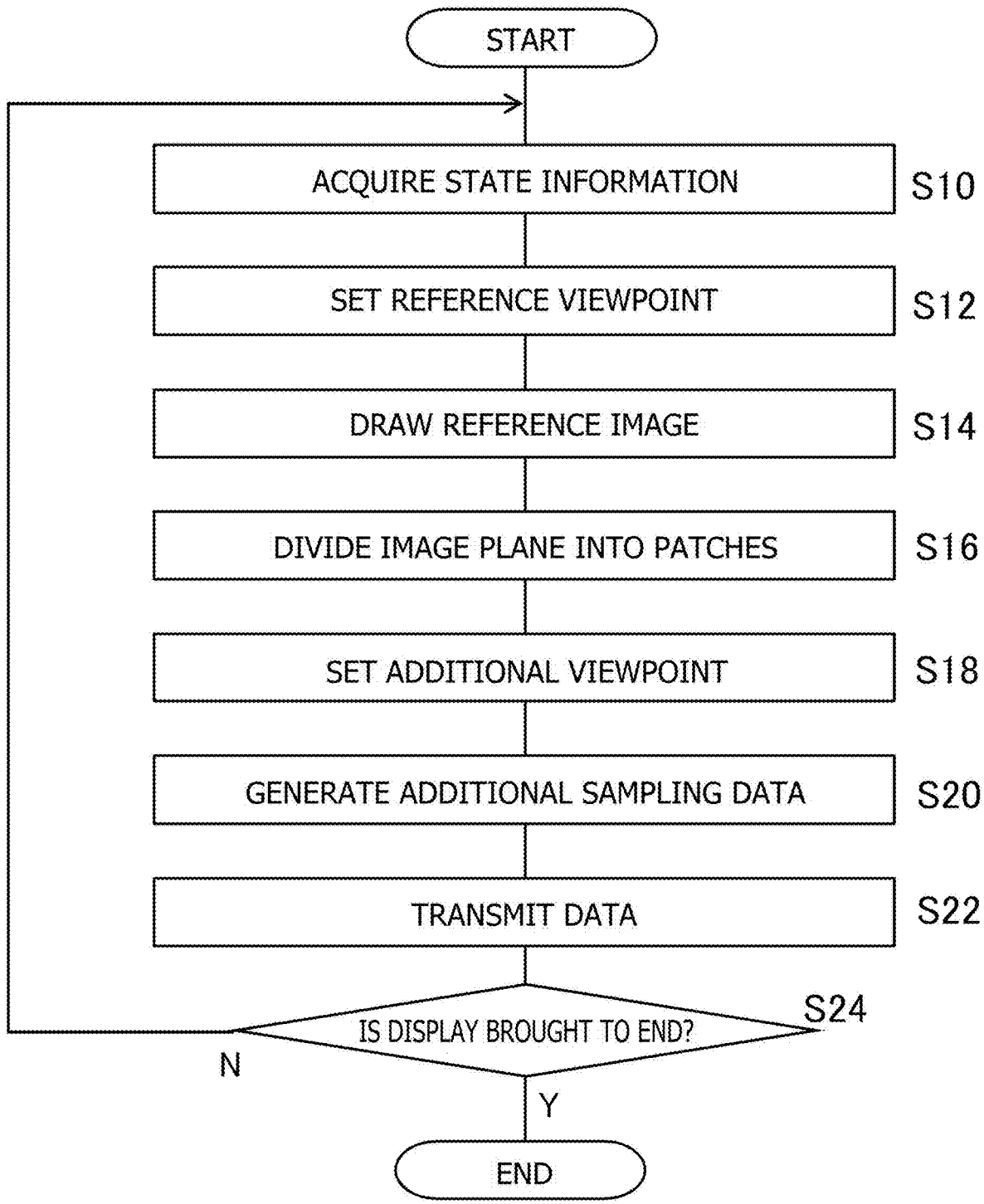
FIG. 12 is a flowchart illustrating a processing procedure in which the image data generation device generates and transmits image data in the present embodiment.

Next, the operation of the image display system that can be implemented by the above-mentioned configuration is described. FIG. 12 is a flowchart illustrating a processing procedure in which the image data generation device 200 generates and transmits image data. First, the state information acquisition unit 260 acquires state information associated with the position and the orientation of the head-mounted display 100 (S10). Next, the viewpoint setting unit 262 sets a reference viewpoint so as to correspond to the position and the orientation in question (S12). Subsequently, the reference image drawing unit 264 sets a view screen for the reference viewpoint and draws a reference image representing an object through ray tracing or the like (S14).

Moreover, the reference image drawing unit 264 divides the image plane into patches on the basis of depth information or the like regarding the reference image and extracts depth information regarding the vertices (S16). On the other hand, the additional data generation unit 268 sets an additional viewpoint different from the reference viewpoint (S18) and acquires color information regarding a partial point on the object seen from the additional viewpoint through ray tracing or the like, thereby generating additional sampling data (S20). Note that, as described above, the additional data generation unit 268 may set an additional viewpoint by predicting the latest viewpoint on the basis of the history of viewpoint movements. Alternatively, the additional data generation unit 268 may identify, from the shape of the object or the like, a part in which disocclusion is likely to occur and set a viewpoint that allows the part in question to be seen from another angle as an additional viewpoint.

The part in which disocclusion is likely to occur may be a region in which a patch with an area equal to or smaller than a predetermined value is formed, as a result of the patch division of the reference image in S16. The additional data generation unit 268 acquires color information regarding a point on the object that is in the vicinity of the region in question and not represented in the reference image, as additional sampling data. Then, the image data transmission unit 270 associates the reference image data with the additional sampling data, which are exemplified in FIG. 9, and transmits the resultant to the head-mounted display 100 (S22). Until there arises a need to end the display due to user operations or the like, the image data generation device 200 repeats the processing from S10 to S22 on a frame-by-frame basis (N in S24). When there arises a need to end the display, the image data generation device 200 ends all the processing (Y in S24).

Figure 13:
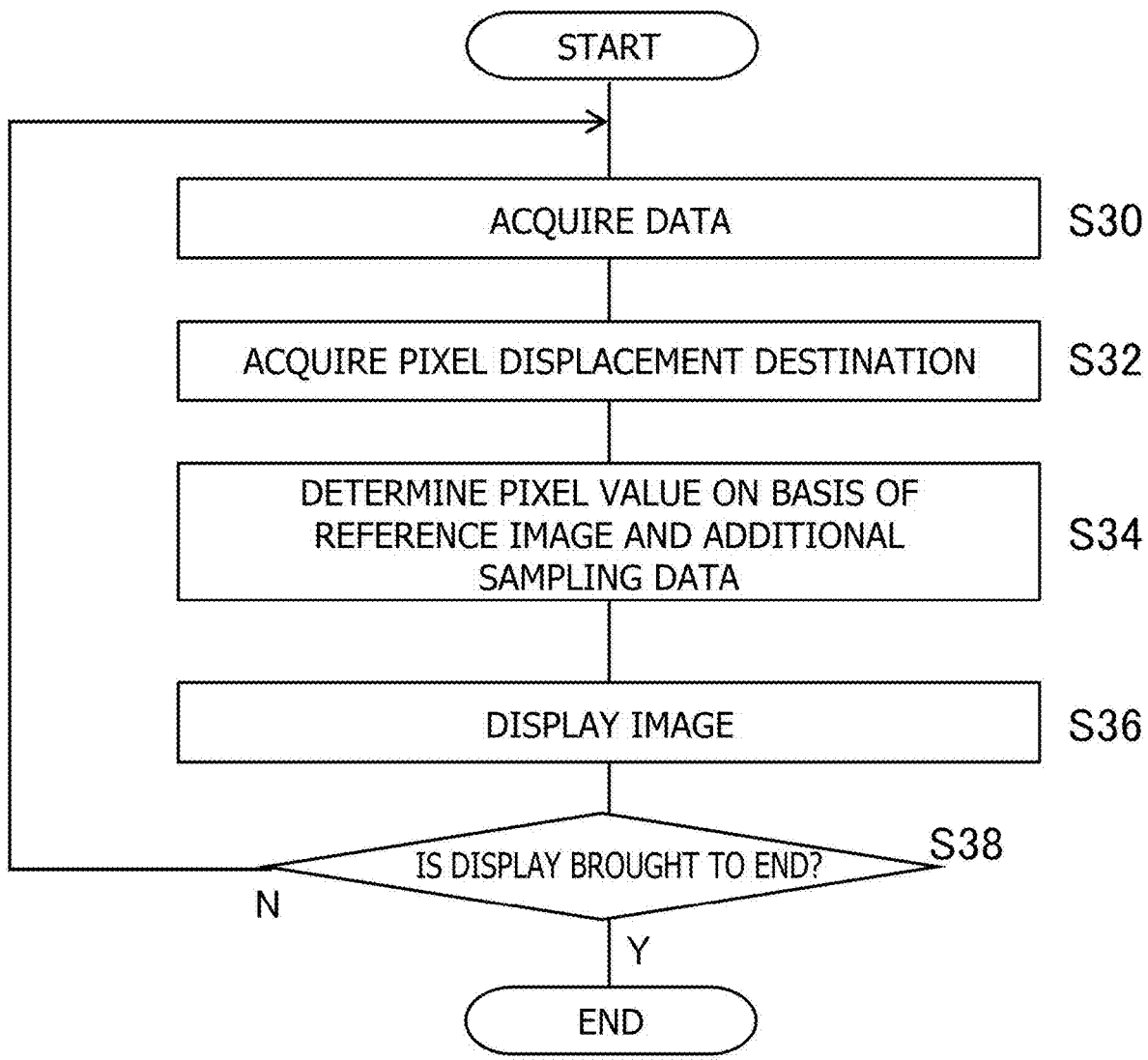
FIG. 13 is a flowchart illustrating a processing procedure in which the head-mounted display displays an image in the present embodiment.

FIG. 13 is a flowchart illustrating a processing procedure in which the head-mounted display 100 displays an image. First, the image data acquisition unit 272 acquires reference image data and additional sampling data from the image data generation device 200 in association with each other (S30). Next, the pixel displacement processing unit 278 of the reprojection unit 276 sets the latest viewpoint according to the latest position and orientation of the head-mounted display 100 and acquires the displacement destinations of the pixels in the reference image which correspond to a viewpoint change from the reference viewpoint (S32). This processing may be achieved through the 3D warping of patches.

Next, the pixel value determination unit 280 determines the pixel values of the display image by use of the reference image and the additional sampling data (S34). Specifically, the pixel value determination unit 280 determines the pixel values of the display image on the basis of the positional relation of pixels before and after displacement in response to the viewpoint change, by use of color information regarding the corresponding positions in the reference image. Further, the pixel value determination unit 280 determines the pixel values of a part in which disocclusion has occurred using color information regarding the corresponding points in the additional sampling data. The processing processes may be performed separately or simultaneously. In the former case, a "hole" part in which pixel values cannot be determined due to disocclusion is filled later by use of the additional sampling data. In the latter case, when the positions on the reference image corresponding to the pixels in the display image are referred to, additional color information is inserted, and filtering is performed. Besides, the reprojection unit 276 may appropriately perform corrections necessary for display.

The display unit 282 sequentially outputs the display image data generated through reprojection by the reprojection unit 276 to the display panel, thereby allowing the display panel to display the images (S36). Until there arises a need to end the display due to user operations or the like, the head-mounted display 100 repeats the processing from S30 to S36 on a frame-by-frame basis (N in S38). When there arises a need to end the display, the head-mounted display 100 ends all the processing (Y in S38).

FIG. 14 to FIG. 18 illustrate actual drawing results. First, in FIG. 14, (a) illustrates a reference image obtained as a result of drawing a three-dimensional space in which a cube and a cylinder are arranged, and (b) illustrates the result of drawing an image representing the same space seen from another viewpoint, as in (a). Now, on the assumption that the viewpoint from which the image of (b) is obtained is the latest viewpoint, how an image equivalent to the image in question is created from the image of (a) through reprojection is described.

Figure 14:
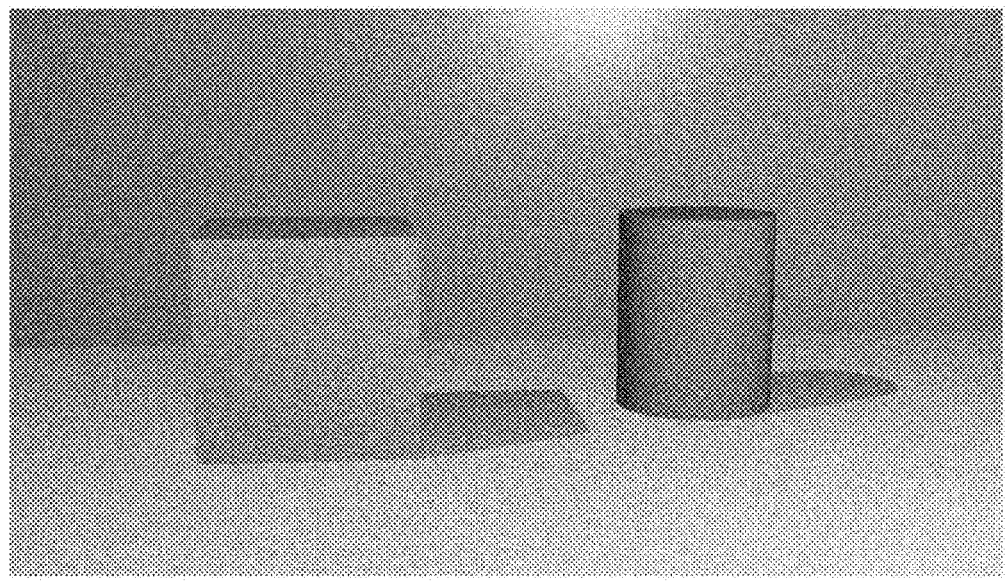
FIG. 14 depicts diagrams illustrating an actual reference image and an image considering the latest viewpoint in the present embodiment.
Figure 14:
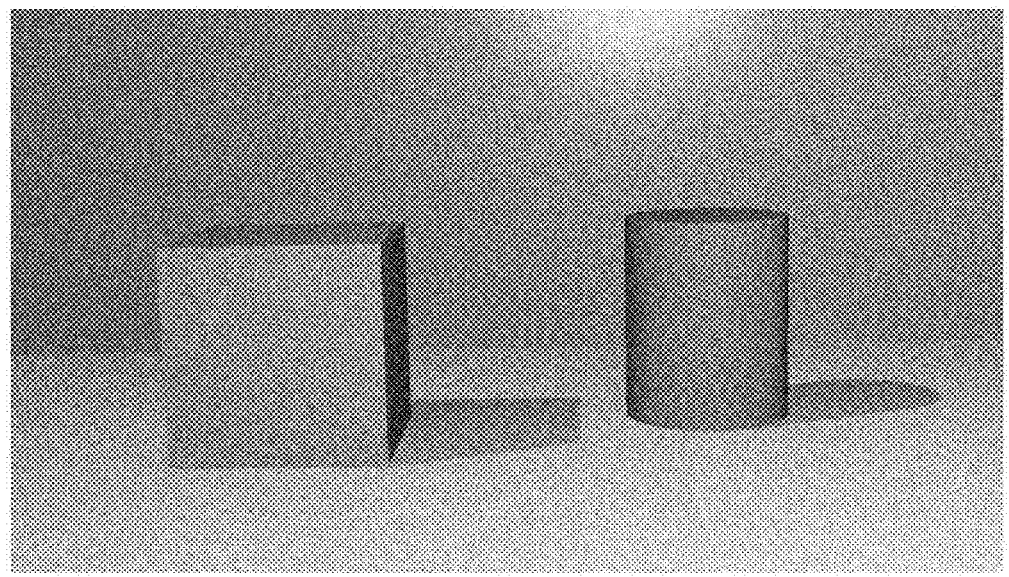
Figure 15:
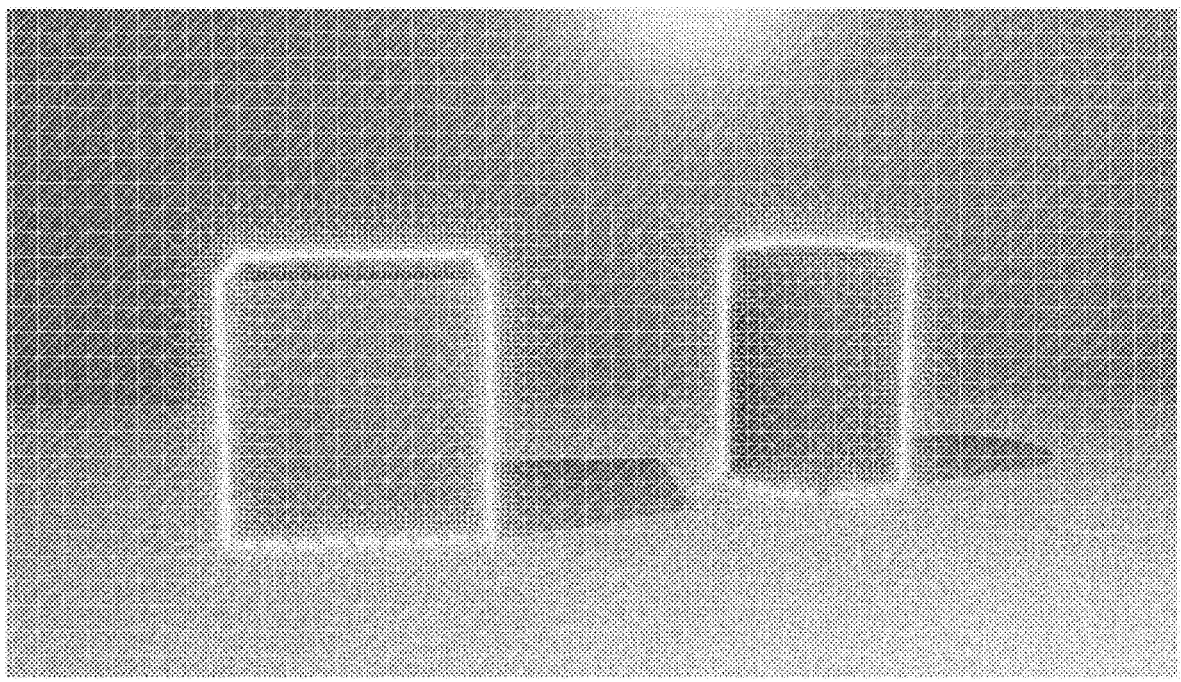
FIG. 15 is a diagram illustrating a state in which the reference image illustrated in FIG. 14 is divided into patches.

FIG. 15 illustrates a state in which the reference image illustrated in (a) of FIG. 14 is divided into patches. In this example, adaptive grid warping is assumed. Thus, the closer the patch division boundaries, which are indicated by the white lines, to the contours of the objects, the higher the density. The patches on the contours have the minimum area with vertices formed by adjacent four pixels, as illustrated in FIG. 11, for example.

Figure 16:
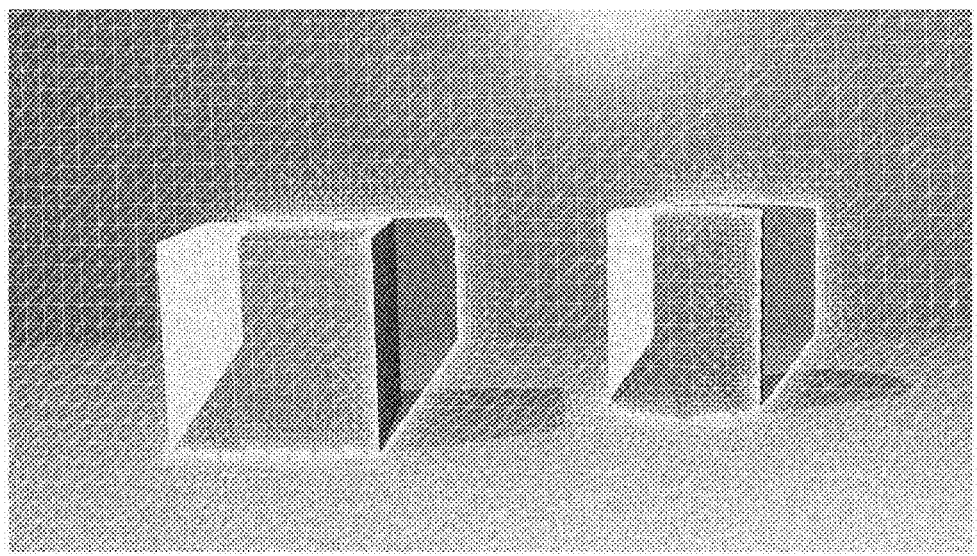
FIG. 16 depicts diagrams illustrating a state in which the patches formed as illustrated in FIG. 15 are warped on the basis of the latest viewpoint, and a state in which pixel values of the reference image are mapped to the warped patches.
Figure 16:
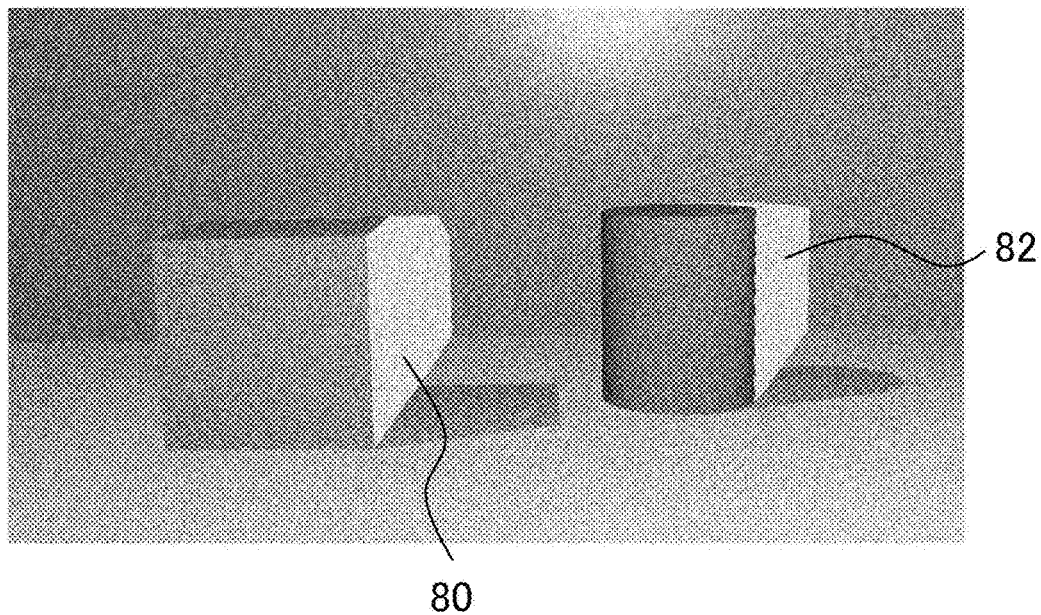
Figure 17:
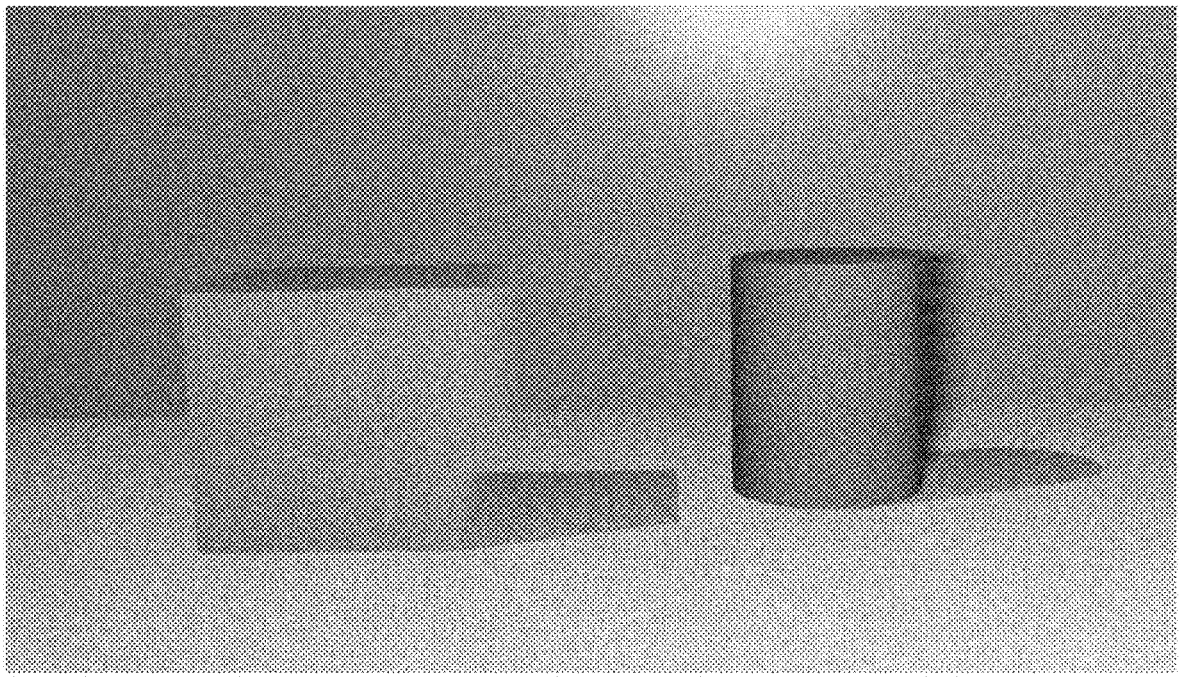
FIG. 17 is a diagram illustrating a result of determining pixel values by filtering color information regarding the reference image also for disocclusion regions.

In FIG. 16, (a) illustrates a state in which the patches formed as in FIG. 15 have been warped on the basis of the latest viewpoint, and (b) illustrates a state in which the pixel values of the reference image have been mapped to the patches after warping. In this image, regions 80 and 82 are disocclusion regions not represented in the reference image illustrated in (a) of FIG. 14. FIG. 17 illustrates the result of also determining the pixel values in the disocclusion regions by filtering color information regarding the reference image. As described for the region 76a of FIG. 11, color bleeding occurs in the disocclusion regions, leading to a state in which the boundaries between the foreground and the background blur, and the surface of the cubic object is indiscernible.

Figure 18:
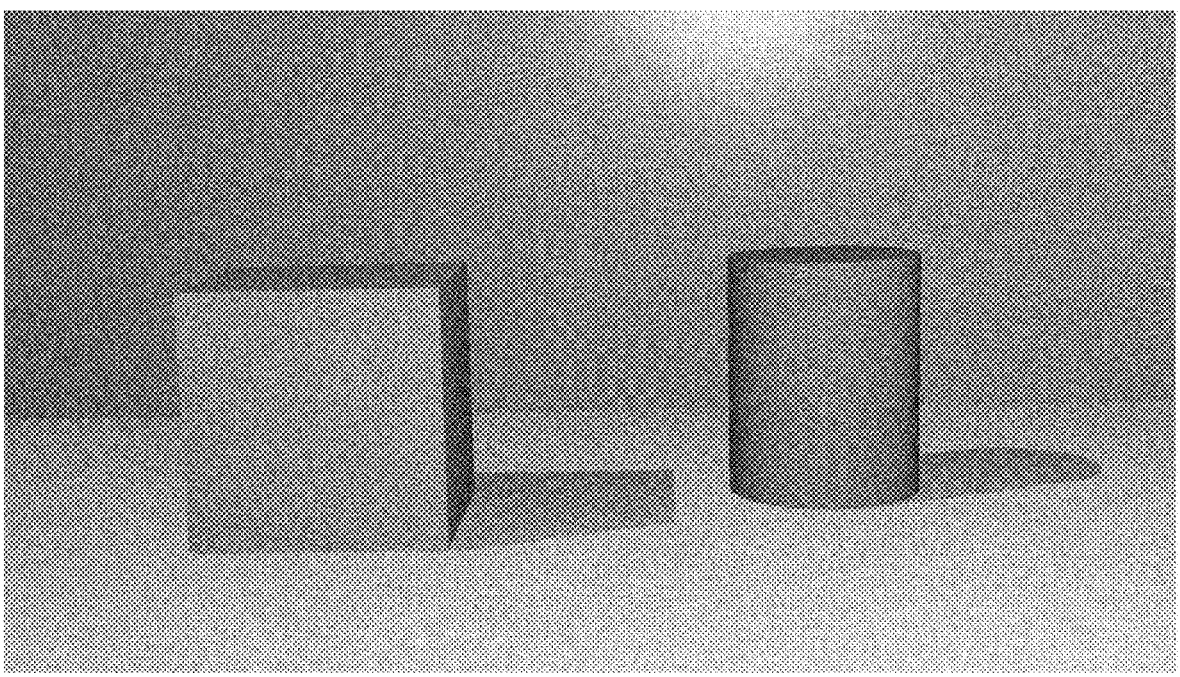
FIG. 18 is a diagram illustrating a result of determining pixel values by use of the reference image and additional sampling data in the present embodiment.

FIG. 18 illustrates the result of determining pixel values by use of the reference image and additional sampling data according to the present embodiment. As a result of also obtaining appropriate color information regarding the disocclusion regions from the additional sampling data, the boundaries between the foreground and the background are clear, and the newly revealed surface of the cube is accurately represented. That is, it is found that an image close to the original image illustrated in (b) of FIG. 14 can be obtained through reprojection.

According to the present embodiment described above, the image data generation device generates a reference image at a reference viewpoint in response to viewpoint operations on the display side, transmits the reference image, and generates a display image corresponding to the latest viewpoint through reprojection in the display device. On this occasion, the image data generation device speculatively generates color information regarding, of an object seen from another viewpoint, a region in which disocclusion may occur due to a viewpoint change from the reference viewpoint, and transmits the color information as additional sampling data. With this, when disocclusion actually occurs in reprojection in the display device, accurate color information can be inserted by use of the additional sampling data, thereby allowing for accurate display of an image from the most recent viewpoint.

In reprojection, 3D warping in units of patches obtained by dividing an image surface is used. Here, the image surface is divided such that patches closer to the contours of the silhouette image of an object have smaller areas, thereby making it possible to achieve more accurate warping near the contours, which are required to be accurately represented, and to identify regions suitable for additional sampling along with patch division. As a result, silhouette image changes near the contours caused by a viewpoint change can efficiently and accurately be represented. By using additional sampling data, the accuracy of reprojection is enhanced, thereby allowing for the setting of the image generation rate independent of the display frame rate. As a result, it is possible to take time for drawing high-quality reference images while reducing the transfer data size, thereby displaying high-definition images with high responsiveness.

The present invention has been described above on the basis of the embodiment. The embodiment is exemplary, and it is understood by those skilled in the art that various modifications of the combinations of the components and processing processes of the embodiment are possible, and that such modifications are also within the scope of the present invention.

REFERENCE SIGNS LIST

100: Head-mounted display
110: Stereo camera
120: CPU
122: Main memory
124: Display unit
132: Communication unit
134: Motion sensor
200: Image data generation device
222: CPU
224: GPU
226: Main memory
232: Communication unit
234: Storage unit
260: State information acquisition unit
262: Viewpoint setting unit
264: Reference image drawing unit
266: Scene data storage unit
268: Additional data generation unit
270: Image data transmission unit
272: Image data acquisition unit
274: State information transmission unit
276: Reprojection unit
278: Pixel displacement processing unit
280: Pixel value determination unit
282: Display unit

INDUSTRIAL APPLICABILITY

As described above, the present invention can be utilized for various information processing devices such as an image data generation device, an electronic content server, an image distribution server, a head-mounted display, a game console, an image display device, a mobile terminal, and a personal computer, as well as for an image processing system and the like including any of them.

The invention claimed is:

1. An image data generation device comprising:
circuitry configured to
set a reference viewpoint at a predetermined time step, on a basis of information associated with a viewpoint change with respect to a space that is a display target;
draw a reference image representing the space in a field of view corresponding to the reference viewpoint;
acquire, as additional sampling data, color information regarding an occluded part in the space not represented in the reference image, after setting a different viewpoint from the reference viewpoint; and
transmit the reference image and the additional sampling data to a display device in association with each other.

2. The image data generation device according to claim 1, wherein the circuitry is configured to predict a viewpoint when the display device performs display processing with use of the reference image, and acquires the color information from the predicted viewpoint.

3. The image data generation device according to claim 1, wherein the circuitry is configured to determine a viewpoint for which the color information is acquired, on a basis of a shape of an object represented in the reference image.

4. The image data generation device according to claim 1, wherein the circuitry is configured to acquire the color information after setting a plurality of viewpoints.

5. The image data generation device according to claim 1, wherein the circuitry is configured to include, in the additional sampling data, information associated with a position of the occluded part for which the color information has been acquired.

6. The image data generation device according to claim 1,
wherein the reference image drawing unit includes, in data on the reference image, position information regarding a vertex of a patch obtained by dividing an image plane by an area based on a depth distribution of an object represented in the reference image, and position information regarding the reference viewpoint, and
the circuitry is configured to extract a target for which the color information is acquired, on a basis of an area of the patch.

7. The image data generation device according to claim 1, wherein the circuitry is configured to draw, through ray tracing from the different viewpoint, a region in the space corresponding to a region in a predetermined range including a contour of a silhouette image in the reference image, thereby acquiring the color information.

8. A display device configured to represent a space that is a display target by changing a field of view, on a basis of information associated with a viewpoint change, the display device comprising:
circuitry configured to
acquire data on a reference image representing the space in a field of view corresponding to a reference viewpoint and additional sampling data including color information regarding an occluded part in the space not represented in the reference image;
transform the reference image into an image in a field of view corresponding to a latest viewpoint and add the color information with use of the additional sampling data, thereby generating a display image; and
output the display image.

9. The display device according to claim 8, wherein the circuitry is configured to:
acquire position information regarding a vertex of a patch obtained by dividing a plane of the reference image and position information regarding the reference viewpoint in association with the reference image, and
perform transformation corresponding to a view screen change from the reference viewpoint to the latest viewpoint in units of the patch.

10. The display device according to claim 8, wherein the circuitry is configured to insert color information indicated by the additional sampling data in filtering of a color value referring to the reference image, thereby determining a pixel value of the display image.

11. The display device according to claim 8, wherein the circuitry is configured to determine a pixel value of the display image by referring to the reference image and then determines a pixel value of a part in which the pixel value is not determined due to occlusion, with use of color information indicated by the additional sampling data.

12. An image data generation method comprising:
- setting a reference viewpoint at a predetermined time step on a basis of information associated with a viewpoint change with respect to a space that is a display target;
- drawing a reference image representing the space in a field of view corresponding to the reference viewpoint;
- acquiring, as additional sampling data, color information regarding an occluded part in the space not represented in the reference image, after setting a different viewpoint from the reference viewpoint; and
- transmitting the reference image and the additional sampling data to a display device in association with each other.

\* \* \* \* \*